United States Patent
Baek et al.

(10) Patent No.: US 10,027,212 B2
(45) Date of Patent: Jul. 17, 2018

(54) HOLLOW BRUSHLESS MOTOR STRUCTURE

(71) Applicant: Samsung Electronics Co., Ltd., Suwon-si, Gyeonggi-do (KR)

(72) Inventors: Jong-ho Baek, Suwon-si (KR); Kyung-bae Lee, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 14/942,453

(22) Filed: Nov. 16, 2015

(65) Prior Publication Data

US 2016/0149459 A1 May 26, 2016

(30) Foreign Application Priority Data

Nov. 20, 2014 (KR) .................. 10-2014-0162608

(51) Int. Cl.
| | |
|---|---|
| *H02K 5/00* | (2006.01) |
| *H02K 21/24* | (2006.01) |
| *H02K 1/27* | (2006.01) |
| *H02K 7/08* | (2006.01) |

(52) U.S. Cl.
CPC .......... *H02K 21/24* (2013.01); *H02K 1/2793* (2013.01); *H02K 7/088* (2013.01)

(58) Field of Classification Search
CPC ........ H02K 21/24; H02K 7/088; H02K 1/2793
USPC .... 310/86, 89–90, 40 R, 192, 266, 268, 429
See application file for complete search history.

(56) References Cited

U.S. PATENT DOCUMENTS

| | | | | |
|---|---|---|---|---|
| 3,733,504 | A | * 5/1973 | Dennis ................... | H02K 5/128 310/105 |
| 2009/0134627 | A1 | * 5/2009 | Stiesdal .................. | F03D 9/021 290/55 |
| 2014/0042833 | A1 | 2/2014 | Hiura et al. | |
| 2015/0207381 | A1 | * 7/2015 | Hauck .................... | H02K 21/24 310/90 |
| 2015/0303767 | A1 | * 10/2015 | Stander ................. | H02K 16/02 290/55 |
| 2015/0364961 | A1 | * 12/2015 | Yoo ........................ | H02K 1/146 310/156.32 |
| 2016/0294253 | A1 | * 10/2016 | Fukunaga ............... | H02K 7/06 |

* cited by examiner

*Primary Examiner* — Thanh Lam
(74) *Attorney, Agent, or Firm* — Jefferson IP Law, LLP

(57) ABSTRACT

A hollow brushless motor is provided. The hollow brushless motor includes a hollow shape rotor to be rotatable about a rotation axis, a hollow shape stator spaced apart from the rotor by a distance in a direction of the rotation axis and arranged to face the rotor, and a first support to maintain a gap between the rotor and the stator, and arranged between the rotor and the stator to support the rotor and the stator such that the rotor rotates with respect to the stator.

14 Claims, 20 Drawing Sheets

HOLLOW BRUSHLESS MOTOR STRUCTURE

CROSS-REFERENCE TO RELATED APPLICATION(S)

This application claims the benefit under 35 U.S.C. § 119(a) of a Korean patent application filed on Nov. 20, 2014 in the Korean Intellectual Property Office and assigned Serial number 10-2014-0162608, the entire disclosure of which is hereby incorporated by reference.

TECHNICAL FIELD

The present disclosure relates to methods and apparatuses for a hollow brushless motor to drive a structure arranged in a rotation axis direction.

BACKGROUND

Electric motors convert electrical energy into mechanical energy by using a force applied to a conductive material, through which an electrical current flows, in a magnetic field, and are used in various products in all industrial fields. More particularly, a brushless motor without a brush or commutator is broadly used by arranging a permanent magnet on a rotor and arranging a stator core and winding coils on a stator.

The brushless motor usable in a driving system including a structure having components arranged in a rotation axis direction, for example, a lens of a vision apparatus or a barrel installed around the lens, is also required to simultaneously accomplish miniaturization and a high output power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for a hollow brushless motor apparatus to drive a structure arranged in a rotation axis direction.

Additional aspects will be set forth in part in the description which follows and, in part, will be apparent from the description, or may be learned by practice of the presented embodiments of the present disclosure.

In accordance with an aspect of the present disclosure, a hollow brushless motor is provided. The hollow brushless motor includes a hollow shape rotor configured to be rotatable about a rotation axis, a hollow shape stator spaced apart from the rotor by a distance in a direction of the rotation axis and arranged to face the rotor, and a first support configured to maintain a gap between the rotor and the stator, and arranged between the rotor and the stator to support the rotor and the stator such that the rotor rotates with respect to the stator.

In accordance with another aspect of the present disclosure, a first support is provided. The first support includes a plurality of first balls configured to contact a first surface of the rotor and a first surface of the stator to support the rotor and the stator, and a hollow shape first retainer including first ball receptacles configured to accommodate the plurality of first balls.

In accordance with another aspect of the present disclosure, a hollow brushless motor is provided. The hollow brushless motor includes a center unit of a hollow shape including a first fixing portion having a cylindrical shape and being extended in the rotation axis direction, a second fixing portion having a hollow plate shape and being extended in a radial direction of the rotation axis from an outer side of the first fixing portion, and a third fixing portion having a hollow plate shape and being fixed to the outer side of the first fixing portion and arranged to face the second fixing portion, wherein the stator may be inserted around the first fixing portion to be fixedly connected to the outer side of the first fixing portion, and the rotor and the first retainer may be inserted around the first fixing portion and spaced apart from the outer side of the first fixing portion in the radial direction of the rotation axis.

In accordance with another aspect of the present disclosure, a hollow brushless motor is provided. The hollow brushless motor includes a second support arranged between the rotor and the second fixing portion and configured to support the rotor and the second fixing portion such that the rotor rotates about the center unit.

In accordance with another aspect of the present disclosure, a second support is provided. The second support includes a plurality of second balls configured to contact a second surface of the rotor and a first surface of the second fixing portion configured to support the rotor and the second fixing portion, and a hollow shape second retainer including second ball receptacles configured to accommodate the plurality of second balls.

In accordance with another aspect of the present disclosure, a hollow brushless motor is provided. The hollow brushless motor includes a first elastic member arranged between a second surface of the stator and the third fixing portion and configured to apply an elastic force to the stator in the rotation axis direction.

In accordance with another aspect of the present disclosure, a hollow brushless motor is provided. The hollow brushless motor includes a speed reducer including a main body having a ring shape and being arranged between the rotor and the second fixing portion, inserted around the first fixing portion, spaced apart from the outer side of the first fixing portion in the radial direction of the rotation axis, a plurality of center shafts arranged on an outer circumference of the main body and extended in the radial direction of the rotation axis, and a plurality of rollers configured to rotate about the corresponding center shafts, wherein the plurality of rollers contact and slide over the second surface of the rotor and the first surface of the second fixing portion which are arranged to face each other.

In accordance with another aspect of the present disclosure, a hollow brushless motor is provided. The hollow brushless motor includes a ring shape support member arranged between the rotor and the speed reducer and fixed to the rotor to contact the plurality of rollers, wherein the plurality of rollers may contact and slide over the second surface of the rotor and one side of the support member which are arranged to face each other.

In accordance with another aspect of the present disclosure, a rotor is provided. The rotor includes a plurality of permanent magnets with an N polarity and an S polarity alternately arranged in a circumferential direction of the rotation axis, and the stator may include tooth portions arranged in the circumference direction of the rotation axis and disposed to face the plurality of permanent magnets in the rotation axis direction, a plurality of coils corresponding to the respective tooth portions, and a hollow shape stator core arranged to support the tooth portions.

In accordance with another aspect of the present disclosure, a number of magnetic dipoles of the plurality of permanent magnets may be represented by the following equation:

$$Z_2 = Z_1 \pm P \qquad \text{Equation 1,}$$

where $Z_2$ is a number of magnetic dipoles of the rotor, $Z_1$ is a number of the tooth portions of the stator, and P is a number of magnetic dipoles of the stator.

In accordance with another aspect of the present disclosure, a rotor is provided. The rotor includes a plurality of ball receptacles arranged on a first surface of the rotor, and the first support may include a plurality of first balls to be accommodated in the corresponding ball receptacles and to support the rotor and the stator by contacting a first surface of the rotor and a first surface of the stator arranged to face the first surface of the rotor.

In accordance with another aspect of the present disclosure, a hollow brushless motor is provided. The hollow brushless motor includes a center unit including a first fixing portion having a cylindrical shape extended in the rotation axis direction, a second fixing portion having a hollow plate shape and being extended in a radial direction of the rotation axis from an outer side of the first fixing portion, and a third fixing portion having a hollow plate shape and being fixed to the outer side of the first fixing portion and arranged to face the second fixing portion, wherein the stator may be inserted around the first fixing portion to be fixedly connected to the outer side of the first fixing portion, and the rotor may be inserted around the first fixing portion and spaced apart from the outer side of the first fixing portion in the radial direction of the rotation axis.

In accordance with another aspect of the present disclosure, a hollow brushless motor is provided. The hollow brushless motor includes a second support arranged between the rotor and the second fixing portion to support the rotor and the second fixing portion such that the rotor rotates about the center unit.

In accordance with another aspect of the present disclosure, a rotor is provided. The rotor includes a plurality of second ball receptacles arranged in a second surface of the rotor, and the second support may include a plurality of second balls to be accommodated in the corresponding second ball receptacles and arranged to support the rotor and the stator by contacting a second surface of the stator which is arranged to face the first surface of the rotor.

In accordance with another aspect of the present disclosure, a hollow brushless motor is provided. The hollow brushless motor includes a first elastic member arranged between a second surface of the rotor and the third fixing portion to apply an elastic force to the stator in the rotation axis direction.

In accordance with another aspect of the present disclosure, a hollow brushless motor is provided. The hollow brushless motor includes a speed reducer including a main body having a ring shape and being arranged between the rotor and the second fixing portion, inserted around the first fixing portion, spaced apart from the outer side of the first fixing portion in the radial direction of the rotation axis, a plurality of center shafts arranged on an outer circumference of the main body and extended in the radial direction of the rotation axis, and a plurality of rollers configured to rotate about the corresponding center shafts, wherein the plurality of rollers may contact and slide over the second surface of the rotor and the first surface of the second fixing portion which are arranged to face each other.

In accordance with another aspect of the present disclosure, a hollow brushless motor is provided. The hollow brushless motor includes a ring shape support member arranged between the rotor and the speed reducer and fixed to the rotor to contact the plurality of rollers, wherein the plurality of rollers may contact and slide over the second surface of the rotor and one side of the support member which are arranged to face each other.

In accordance with another aspect of the present disclosure, a hollow brushless motor is provided. The hollow brushless motor includes a hollow shape rotor configured to be rotatable about a rotation axis, a hollow shape stator spaced apart from the rotor by a distance in a direction of the rotation axis and arranged to face the rotor, and a radial ball bearing comprising a first hollow housing fixed to the rotor to support the rotor, a second hollow housing fixed to the stator to support the stator, and a plurality of center balls to be accommodated in the combined first and second housings.

In accordance with another aspect of the present disclosure, a hollow brushless motor is provided. The hollow brushless motor includes a center unit including a first fixing portion having a cylindrical shape and being extended in the rotation axis direction, and a second fixing portion having a hollow plate shape and being extended in a radial direction of the rotation axis from an outer side of the first fixing portion, wherein the stator and the second housing are inserted around the first fixing portion and fixed to an outer side of the first fixing portion, and the rotor and the first housing are inserted around the first fixing portion and spaced apart from the outer side of the first fixing portion in the radial direction of the rotation axis by a distance.

In accordance with another aspect of the present disclosure, a hollow brushless motor is provided. The hollow brushless motor includes a speed reducer including a main body having a ring shape and being disposed between the rotor and the second fixing portion, inserted around the first fixing portion, spaced apart from the outer side of the first fixing portion by another distance in the radial direction of the rotation axis, a plurality of center shafts arranged on an outer circumference of the main body and extended in the radial direction of the rotation axis, and a plurality of rollers configured to rotate about the corresponding center shafts, wherein the plurality of rollers may contact and slide over the first housing and a first surface of the second fixing portion which are arranged to face each other.

In accordance with another aspect of the present disclosure, a hollow brushless motor is provided. The hollow brushless motor includes a ring shape support member arranged between the rotor and the speed reducer and fixed to the rotor to contact the plurality of rollers, wherein the plurality of rollers contact and slide over the second fixing portion and one side of the support member which are arranged to face each other.

In accordance with another aspect of the present disclosure, a hollow brushless motor is provided. The hollow brushless motor includes an elastic member arranged between the first housing and the support member to apply an elastic force to the support member in the rotation axis direction.

In accordance with another aspect of the present disclosure, a rotor is provided. The rotor includes a plurality of permanent magnets with an N polarity and an S polarity alternately arranged in a circumferential direction of the rotation axis, and the stator may include tooth portions arranged disposed in the circumference direction of the rotation axis and arranged to face the plurality of permanent magnets in the rotation axis direction, a plurality of coils corresponding to the respective tooth portions, and a hollow shape stator core arranged to support the tooth portions.

In accordance with another aspect of the present disclosure, a number of magnetic dipoles of the plurality of permanent magnets may be represented by Equation 1, reproduced below:

$$Z_2 = Z_1 \pm P \quad \text{Equation 1,}$$

where $Z_2$ is a number of magnetic dipoles of the rotor, $Z_1$ is a number of the tooth portions of the stator, and P is a number of magnetic dipoles of the stator.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
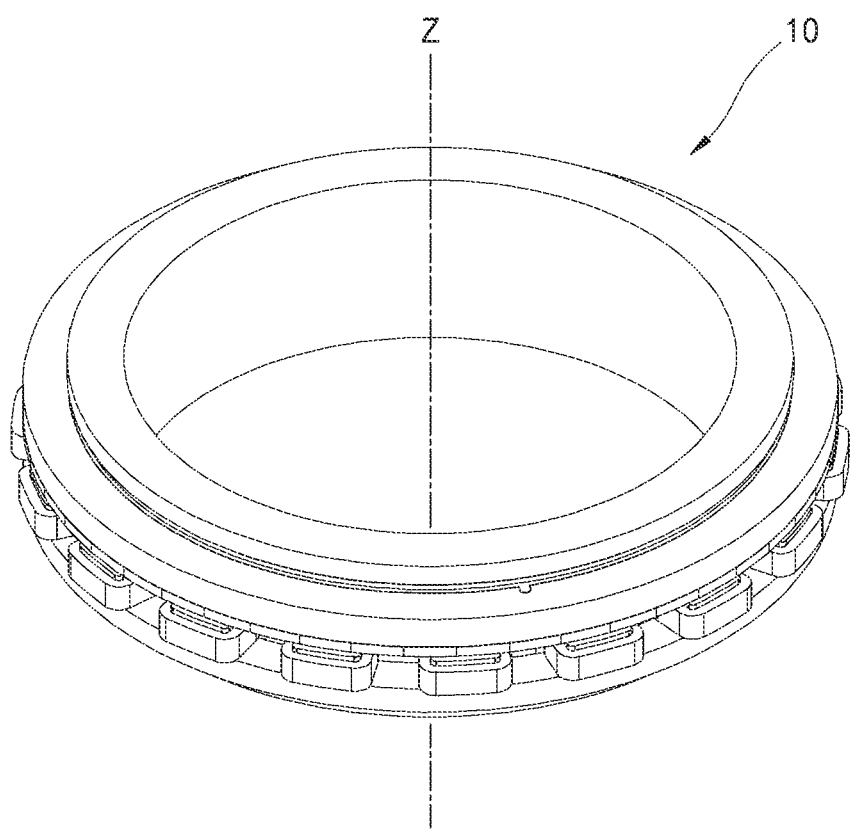
FIG. 1 is a perspective view illustrating a hollow brushless motor according to a first embodiment of the present disclosure.
Figure 2:
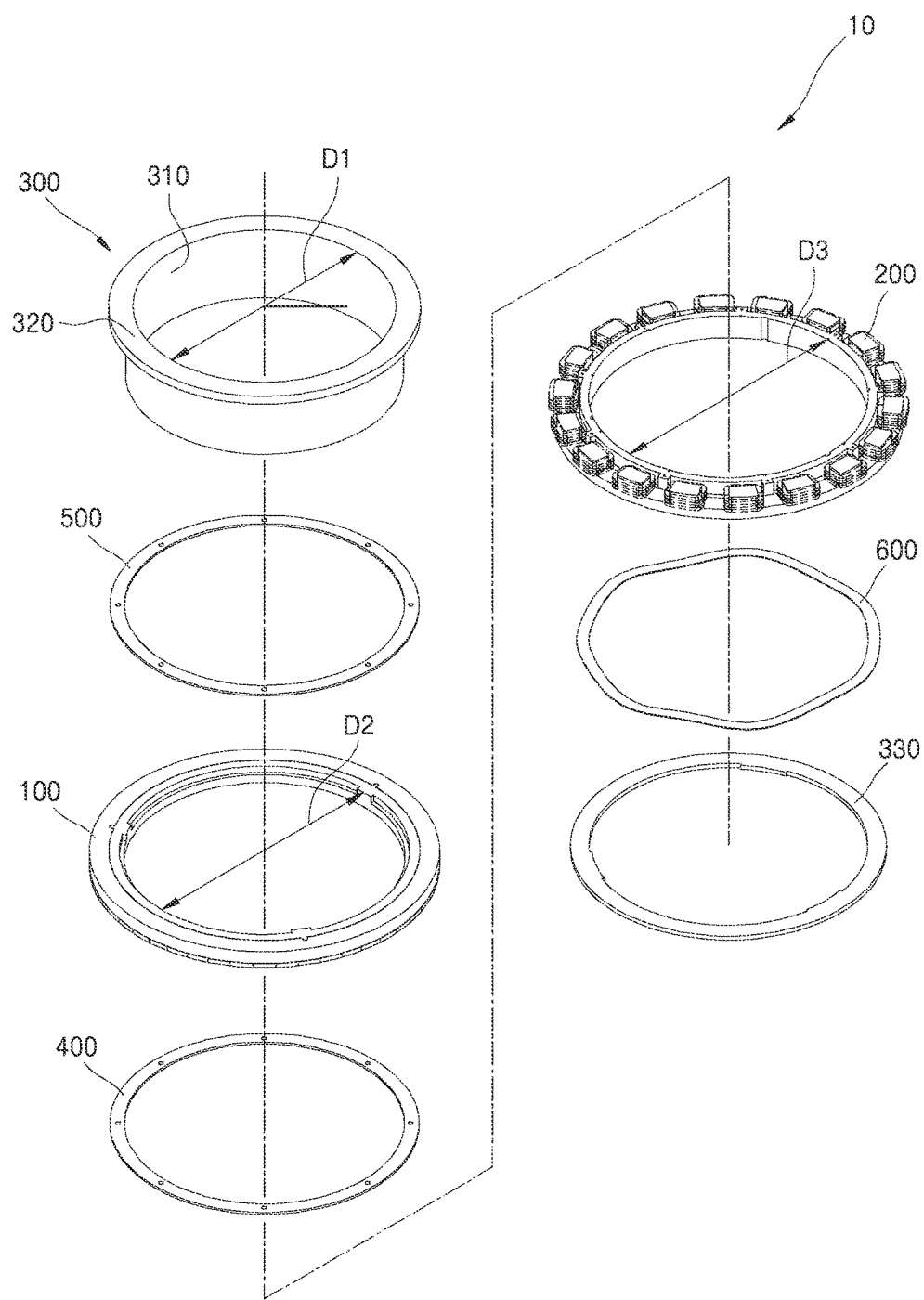
FIG. 2 is an exploded perspective view illustrating a hollow brushless motor according to the first embodiment of the present disclosure.
Figure 3A:
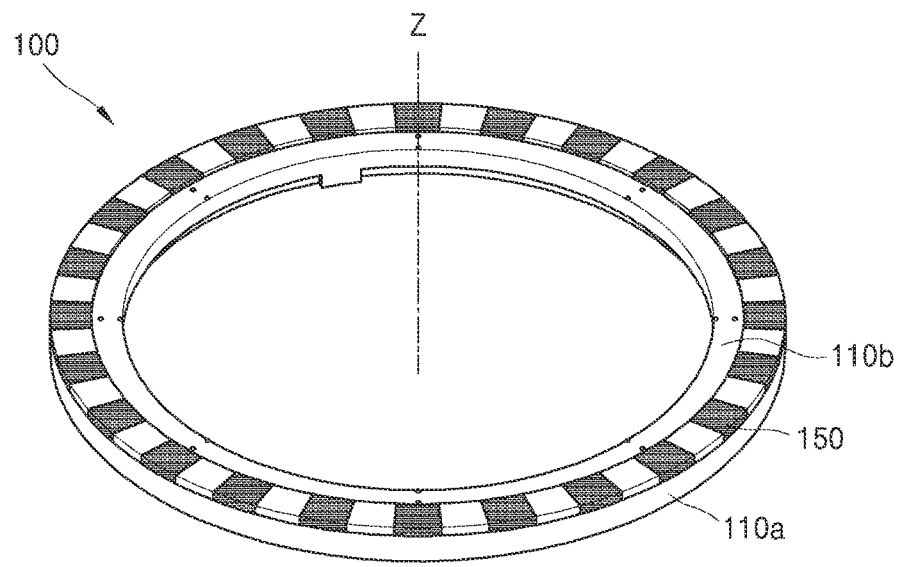
FIG. 3A is a perspective view illustrating a rotor according to an embodiment of the present disclosure.
Figure 3B:
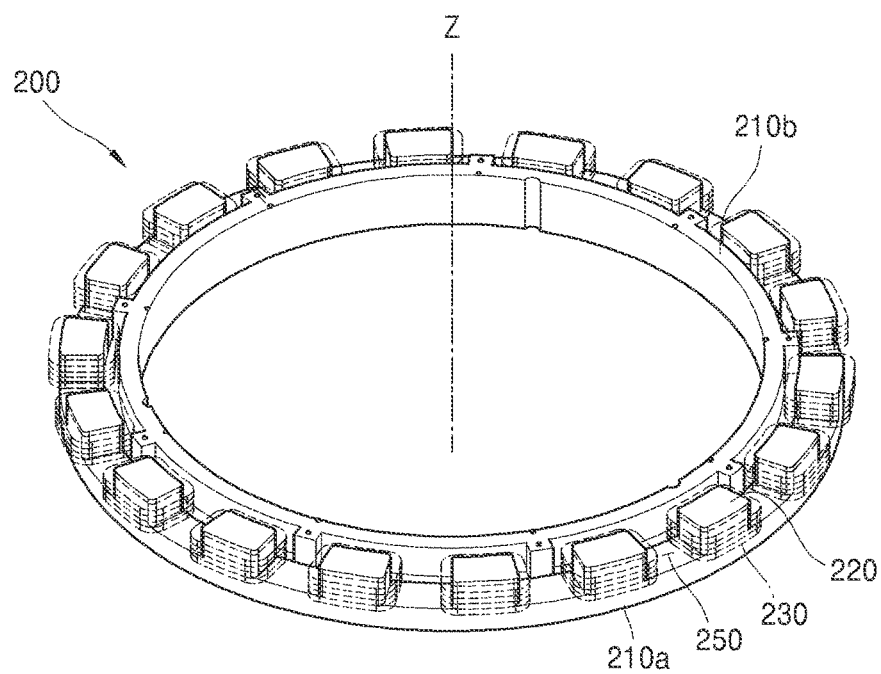
FIG. 3B is a perspective view illustrating a stator according to an embodiment of the present disclosure.
Figure 3C:
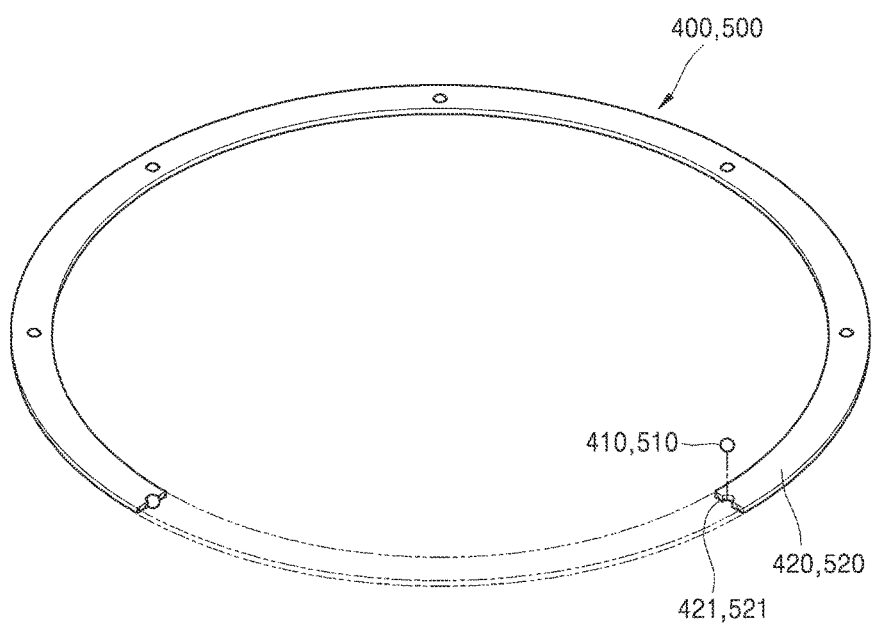
FIG. 3C is a perspective view illustrating a support according to an embodiment of the present disclosure.

FIG. 1 is a perspective view illustrating a hollow brushless motor according to a first embodiment of the present disclosure. FIG. 2 is an exploded perspective view illustrating a hollow brushless motor according to an embodiment of the present disclosure, FIG. 3A is a perspective view illustrating a rotor of a hollow brushless motor according to an embodiment of the present disclosure, FIG. 3B is a perspective view illustrating a stator of a hollow brushless motor according to an embodiment of the present disclosure, and FIG. 3C is a perspective view illustrating a first support and a second support according to an embodiment of the present disclosure.

Referring to FIGS. 1 to 3C, a hollow brushless motor 10 includes a stator 200, a rotor 100 rotating with respect to the stator 200, a center unit 300 to support the stator 200, a first support unit 400 and a second support unit 500 to support the rotor 100 and the stator 200 in a rotation axis direction Z, and a first elastic member 600. The stator 200 may include a stator core 210 having a hollow shape (which includes a first area 210a and a second area 210b), a plurality of tooth portions 220 extended in the rotation axis Z direction and arranged along a circumference direction of the stator core 210. The plurality of tooth portions 220 include coils 230.

The stator core 210 may include a structure of thin metal plates stacked in the rotation axis Z direction and having a ring shape. The plurality of tooth portions 220 are arranged to be spaced apart from each other at equal intervals along the circumference direction of the stator core 210 on a side of the stator core 210 which is arranged to face permanent magnets 150 of the rotor 100 in the rotation axis Z direction. The first area 210a of the stator core 210, to which the plurality of tooth portions 220 are attached in the rotation axis Z direction, may include a paramagnetic substance to form a magnetic flux interlinkage, and the second area 210b of the stator core 210, to which the tooth portions 220 are not attached in the rotation axis Z direction, may include a diamagnetic substance. A plurality of slots 250 having a concave recess shape as a coil receiving space are arranged between the adjacent tooth portions 220 to accommodate the coils 230 winding around the respective tooth portions 220. The plurality of slots 250 are spaced apart from each other at equal intervals along the circumference direction of the stator core 210. For example, the tooth portions 220 and the slots 250 are alternately arranged in the circumference direction of the stator core 210. The coil 230 includes wires winding around the respective tooth portions 220 through an insulator (not illustrated) having insulation characteristic interposed between the wires and the corresponding tooth portions 220.

Figure 4A:
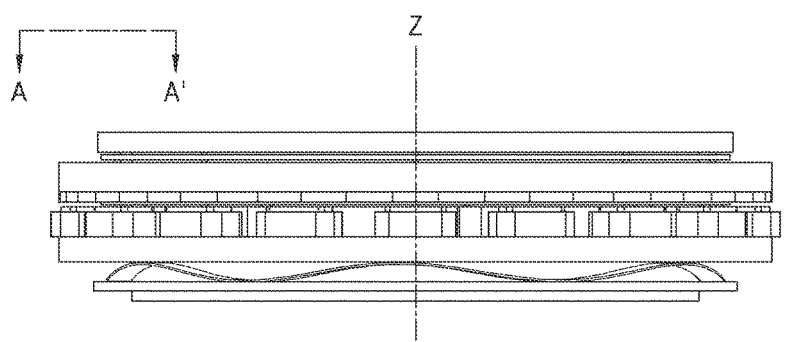
FIG. 4A is a side view illustrating a hollow brushless motor according to an embodiment of the present disclosure.
Figure 4B:
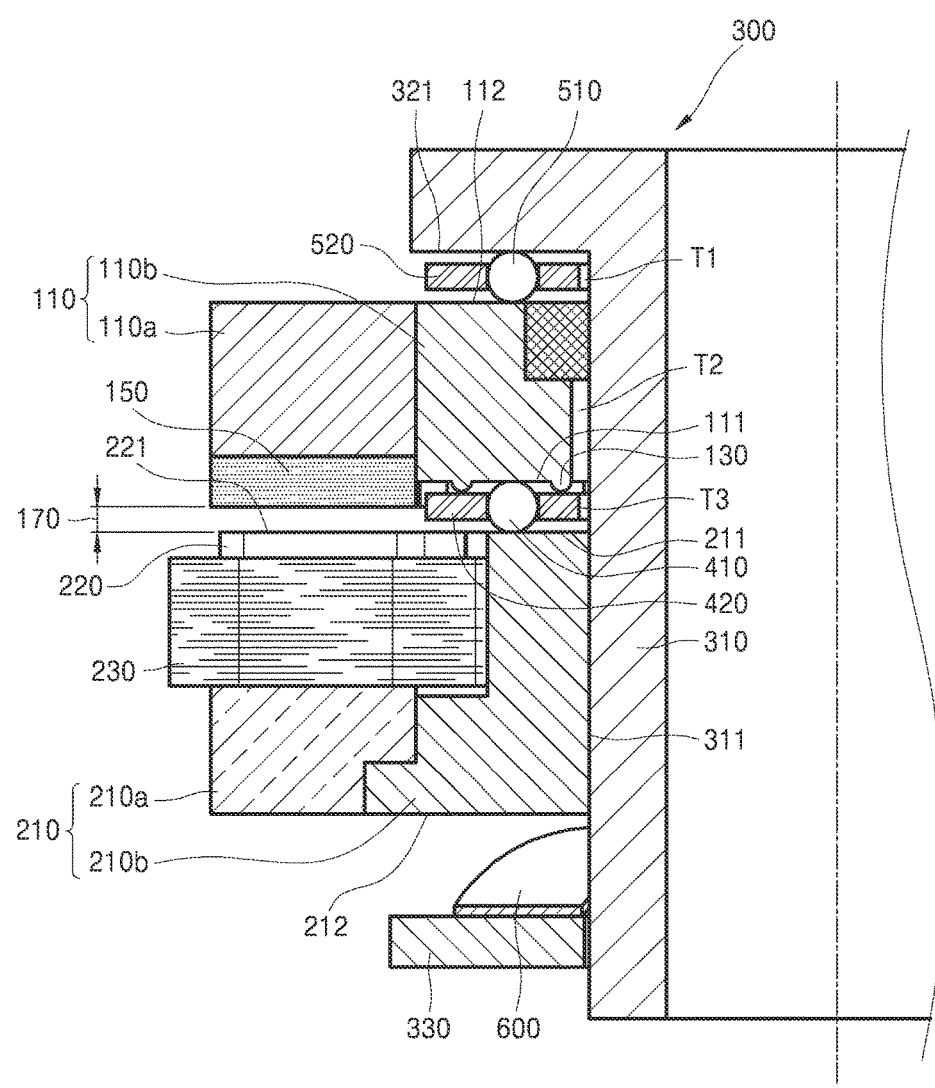
FIG. 4B is a cross-sectional view taken along a line A-A' of FIG. 4A according to an embodiment of the present disclosure.

The rotor 100 is arranged to be spaced apart from an end surface of the tooth portions 220 arranged on the stator 200 by an air gap 170 (FIG. 4B). Referring to FIG. 2, the rotor 100 includes a rotor core 110 (which includes a first area 110a and a second area 110b) and permanent magnets 150. The rotor core 110 has a ring structure having a hollow shape, and may include a stack structure of a plurality of thin plates of ferromagnetic material or magnetically permeable material in the rotation axis Z direction.

The permanent magnets 150 are arranged on a side of the rotor core 110, which is arranged to face the tooth portions 220 of the stator 200, at equal intervals and include S polarity permanent magnets and N polarity permanent magnets which are alternately arranged in a circumference direction of the rotor core 110. A method of mounting the permanent magnets 150 to the rotor core 110 includes a surface permanent magnet (SPM) and an interior permanent magnet (IPM). In the SPM, the permanent magnets 150 are attached to the rotor core 110. In the IPM, the permanent magnets 150 are buried inside the rotor core 110. In the IPM, the permanent magnets 150 are not easily detached from the rotor core 110, and a reluctance torque may be more useful, compared to the SPM. The IPM may be used in a compressor motor of an air conditioner or a refrigerator, for example. The first area 110a of the rotor core 110, to which the permanent magnets 150 are attached to the rotation axis Z direction, may include a paramagnetic substance to form the magnetic flux interlinkage, and the second area 110b of the rotor core 110, to which the permanent magnets 150 are not attached, may include the diamagnetic substance.

The permanent magnets 150 of the rotor 100 and the tooth portions 220 having the coils 230 are arranged to face to each other. However, the present disclosure is not limited to this arrangement. According to one embodiment of the present disclosure, the hollow brushless motor 10 may have a Vernier structure in which a number of the tooth portions 220 of the stator 200 and the permanent magnets 150 of the rotor 200 may be represented by Equation 1, reproduced below.

$$Z_2 = Z_1 \pm P \qquad \text{Equation 1}$$

where $Z_2$ is a number of magnetic dipoles of the rotor 100, $Z_1$ is the number of the tooth portions 220 of the stator 200, and P is a number of magnetic dipoles of the stator 200.

In Equation 1, $Z_2$ is the number of the magnetic dipoles occurring from the permanent magnets 150 of the rotor 100, and P is the number of the magnetic dipoles occurring from the winding coils 230 of the stator 200. For example, the hollow brushless motor 10 may include twelve (12) permanent magnets 150 arranged on the rotor 100, and the number of the magnetic dipoles of the rotor 100 is six (6). In the stator 200, nine (9) tooth portions 220 may be arranged on the stator core 210 in the circumference direction of the stator core 210. In addition, in a three-phase hollow brushless motor 10, since nine (9) tooth portions 220 are arranged at equal intervals, and the coils 230 are wound around the respective tooth portions 220, the number of magnetic dipoles may be three (3). For example, in the three-phase hollow brushless motor 10, the tooth portions 220 of the stator core 210 may be arranged to correspond to a multiple of three (3). Here, the number of the permanent magnets 150 of the rotor 100 may be determined to correspond to the number of the tooth portions 220 according to Equation 1. Although the present embodiment describes the three-phase hollow brushless motor 10, the present disclosure is not limited thereto. Depending on a type of the hollow brushless motor 10, the number of tooth portions 220 and the number of the permanent magnets 150 may be determined to satisfy Equation 1.

When the Vernier structure is applied to the hollow brushless motor 10, a motor speed may be reduced by a ratio of $P/Z_2$, compared to a general brushless motor, but a torque density may increase. Accordingly, since the hollow brushless motor 10 according to an embodiment of the present disclosure may be driven at half a speed of a general brushless motor and generate twice a torque of the general brushless motor, the hollow brushless motor 10 may be usable in a driving apparatus requiring a high torque at a low speed, for example, a driving apparatus of a barrel mounted with a lens or an imaging device having a lens.

The center unit 300 may include a first fixing portion 310 as a support structure to support a driven object, such as the lens of the imaging device, in which the stator 200 is supported, a second fixing portion 320 to support the rotor 100 and the stator 200 in the rotation axis Z direction, and a third fixing portion 330. The first fixing portion 310 may be a cylindrical shape extended in the rotation axis Z direction. The driven object may be arranged inside the first fixing portion 310. The first fixing portion 310 may have a diameter D1 smaller than a diameter D2 of the rotor core 110 and a diameter D3 of the rotor core 210 so as for the stator 200 to be inserted around the first fixing portion 310.

The second fixing portion 320 and the third fixing portion 330 are a hollow plate member which is extended in a radial the rotation axis Z direction the rotation axis Z direction and are fixed to the first portion 310 to face each other. The second fixing portion 320 and the third fixing portion 330 may be formed as a single body or as detachable bodies. The rotor 100 and the stator 200 inserted around the first fixing portion 310 may be arranged between the second fixing portion 320 and the third fixing portion 330.

According to an embodiment of the present disclosure, the first support unit 400 and the second support unit 500 are a support structure to support the rotor 100 and the stator 200 in the rotation axis Z direction and may include hollow first and second retainers 420 and 520 including a plurality of first and second balls 410 and 510 and first and second receptacles 421 and 521 having a hollow shape to accommodate the plurality of first and second balls 410 and 510, respectively. The plurality of first and second balls 410 and 510 are arranged in the corresponding first and second retainers 420 and 520 at certain intervals along a circumference the rotation axis Z direction. The first support unit 400 and the second support unit 500 are inserted around the first fixing portion 310 and arranged between the rotor 100 and the stator 200 and between the second fixing portion 320 and the stator 200, respectively.

The first elastic member 600 is an elastic member to apply an elastic force to the stator 200 in the rotation axis Z direction and may include a wave spring, for example. The first elastic member 600 is inserted around the first fixing portion 310 and arranged between the stator 200 and the third fixing portion 330.

FIG. 4A is a side view illustrating the hollow brushless motor 10 according to an embodiment of the present disclosure, and FIG. 4B is a cross-sectional view taken along a line A-A' of FIG. 4A according to an embodiment of the present disclosure.

Referring to FIGS. 4A and 4B, the rotor 100 and the stator 200 may be inserted around the first fixing portion 310 of the center unit 300. The stator 200 may be fixed to an outer surface of the first fixing portion 310, and the rotor 100 may be arranged to be spaced apart from the first fixing portion 310 by a second gap T2 and to be rotatable with respect to the first fixing portion 310 and the stator 200.

The permanent magnets 150 of the rotor 100 and ends 221 of the tooth portions 220 of the stator core 210 are arranged to face each other in the rotation axis Z direction. Here, an air gap 170 is formed between the permanent magnets 150 of the rotor 100 and the ends 221 of the tooth portions 220 of the stator core 210 such that the rotor 100 and the stator 200 are spaced apart from each other by a certain distance in the rotation axis Z direction.

However, the present disclosure is not limited to the above-described relative relationship between the rotor 100 and the stator 200. The rotor 100 may be arranged above the stator 200 to have a distance between the rotor 100 and the stator 200 in the rotation axis Z direction. Here, the permanent magnets 150 of the rotor 100 and the ends 221 of the tooth portions 220 of the stator core 220 are arranged to face each other in the rotation axis Z direction.

The first support unit 400 may be arranged between the rotor 100 and the stator 200 to support the rotor 100 and the stator 200 such that the air gap 170 is formed between the permanent magnets 150 of the rotor 100 and the ends 221 of the tooth portions 220. The plurality of first balls 410 of the first support unit 400 may make point-contacts with a first surface 111 of the rotor 100 and a first surface 211 of the stator 200 to support the rotor 100 and the stator 200. As described above, the stator 200 may be fixedly coupled to the first fixing portion 310, and the first retainer 420 having a ring shape may accommodate the plurality of the first balls 410 and may be inserted around the first fixing portion 310 to have a third gap T3 with the first fixing portion 310 in a radial direction of the rotation axis Z direction. Accordingly, the first support unit 400 may support the rotor 100 and also may be rotatable with the rotor 100 with respect to the stator 200 and the first fixing portion 310.

First protrusions 130 may be extended from the first surface 111 of the rotor 100 or the first surface 211 of the stator 200 in the rotation axis Z direction and may be arranged with respect to contact-points between the plurality of first balls 410 and the first surface 211 of the stator 200 or the first surface 111 of the rotor 100. The first protrusions 130 may support the first retainer 420 and may be a plurality of a ring shape protrusion or a plurality of protrusions, for example, arranged in the radial direction of the rotation axis Z direction.

The second support unit 500 may be arranged between the rotor 100 and the second fixing portion 320 of the center unit 300 to support the rotor 100 and the second fixing portion 320 such that the rotor 100 rotates with respect to the center unit 300 having the second fixing portion 320. The plurality of second balls 510 of the second support unit 500 may make point-contacts with a second surface 112 of the rotor 100 and a first surface 321 of the second fixing portion 320 to support the rotor 100 and the second fixing portion 320. Here, the second fixing portion 320 is fixed to the first fixing portion 310, and the second retainer 520 is fixed to the first fixing portion 310. The second retainer 520 may include a ring shape to accommodate the plurality of second balls 510 and may be inserted around the first fixing portion 310 to be spaced apart from the first fixing portion 310 by a first gap T1 in the radial direction of the rotation axis Z direction such that the second support unit 500 supports the rotor 100 and also rotates together with the rotor 100 with respect to the second fixing portion 320.

The first elastic member 600 may be arranged between the stator 200 and the third fixing portion 330 to support the stator 200. The first elastic member 600 may be a ring-shape spring, for example, and may be inserted around the first fixing portion 310 to be supported by the third fixing portion 330. For example, the first elastic member 600 having the ring-shape spring may contact a second surface 212 of the stator 200 and apply an elastic force to the stator 200 in the rotation axis Z direction to limit a movement of the stator 200 in the rotation axis Z direction when the stator 200 moves in the rotation axis Z direction.

As described above, since the rotor 100 and the stator 200 are arranged in the rotation axis Z direction, a lens may be arranged in an inside space of a hollow shape of the rotor 100 and the stator 200, for example, an inside of the first fixing portion 310 of the center unit 300 in a driving system rotating a rotation axis, for example, a driving system to drive a lens of an imaging device. Therefore, the driving system may be easily realized, and a size of the entire driving system may be miniaturized.

Figure 5:
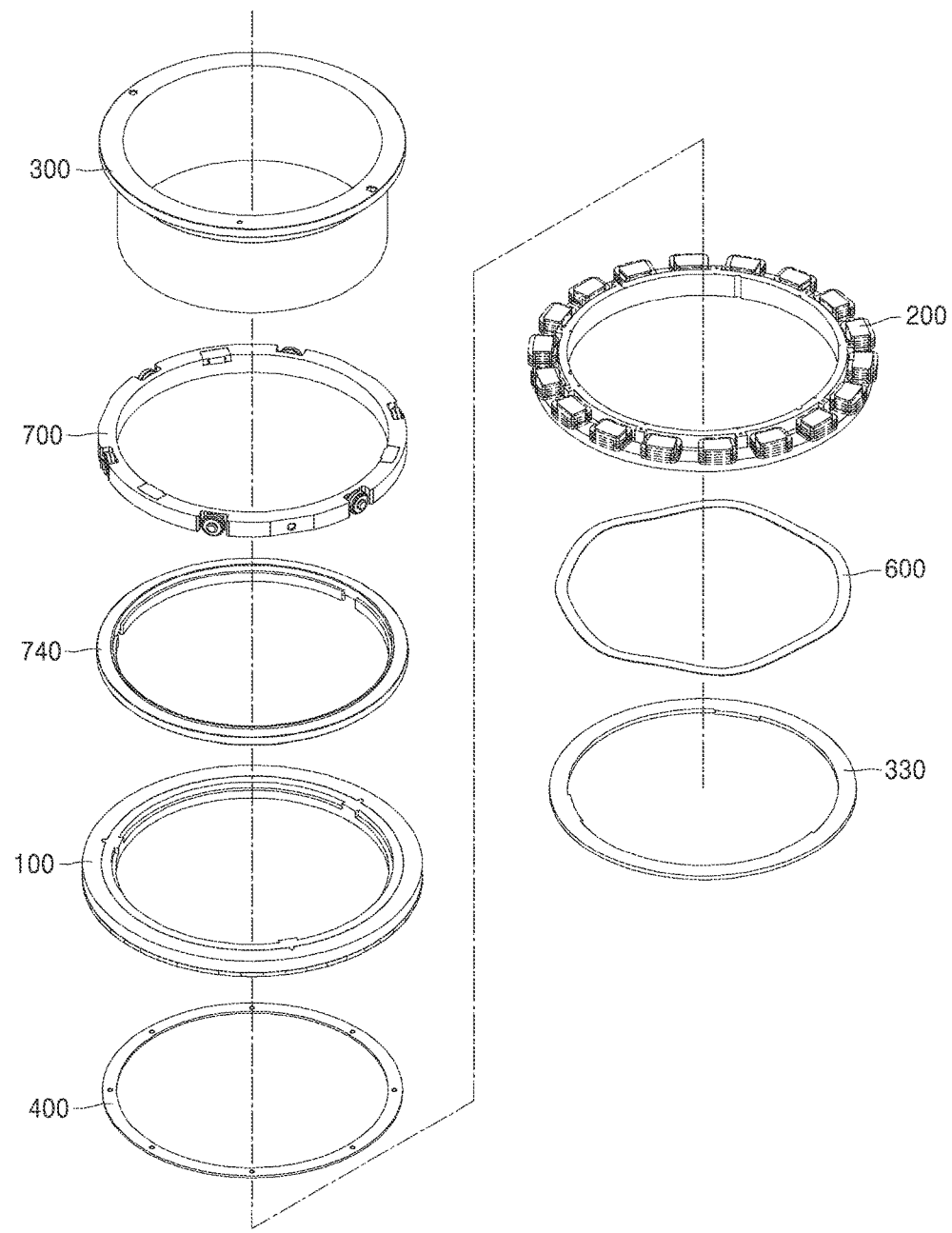
FIG. 5 is an exploded perspective view illustrating a hollow brushless motor according to a second embodiment of the present disclosure.
Figure 6:
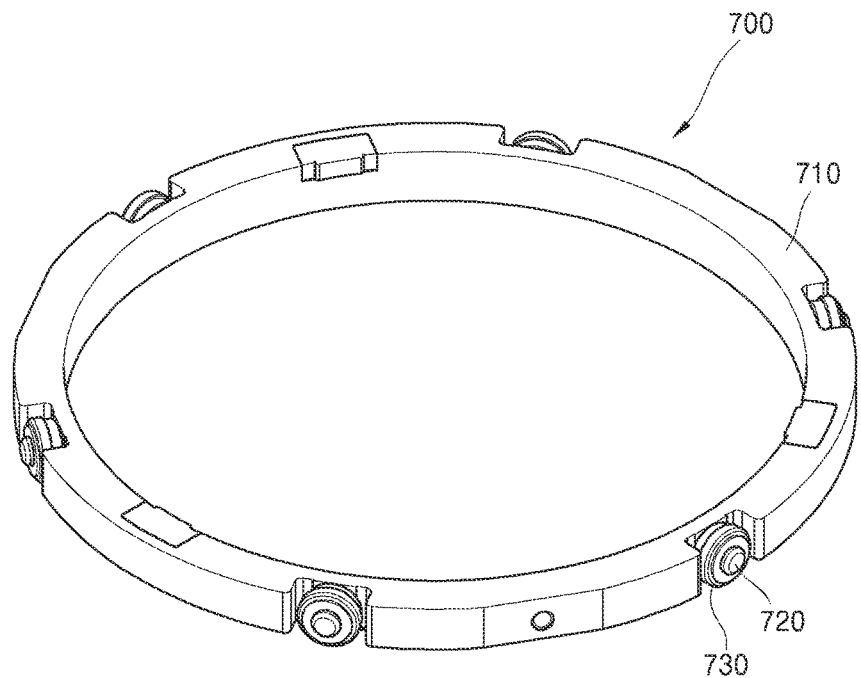
FIG. 6 is a perspective view illustrating a speed reducer of a hollow brushless motor according to an embodiment of the present disclosure.
Figure 7A:
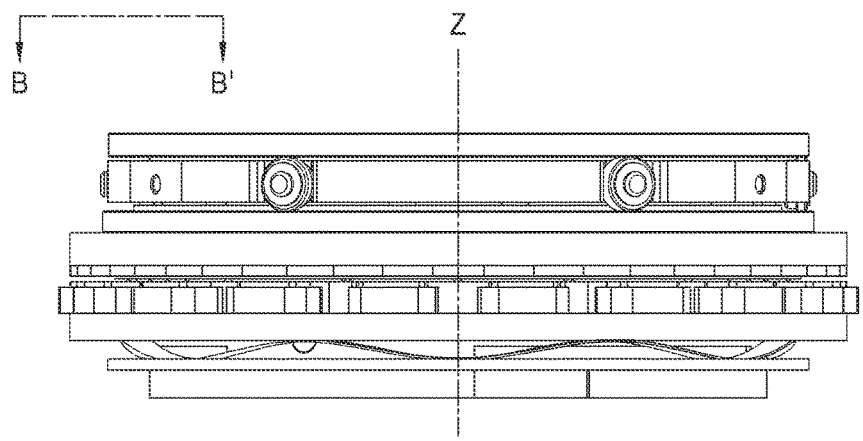
FIG. 7A is a side view of a hollow brushless motor according to an embodiment of the present disclosure.
Figure 7B:
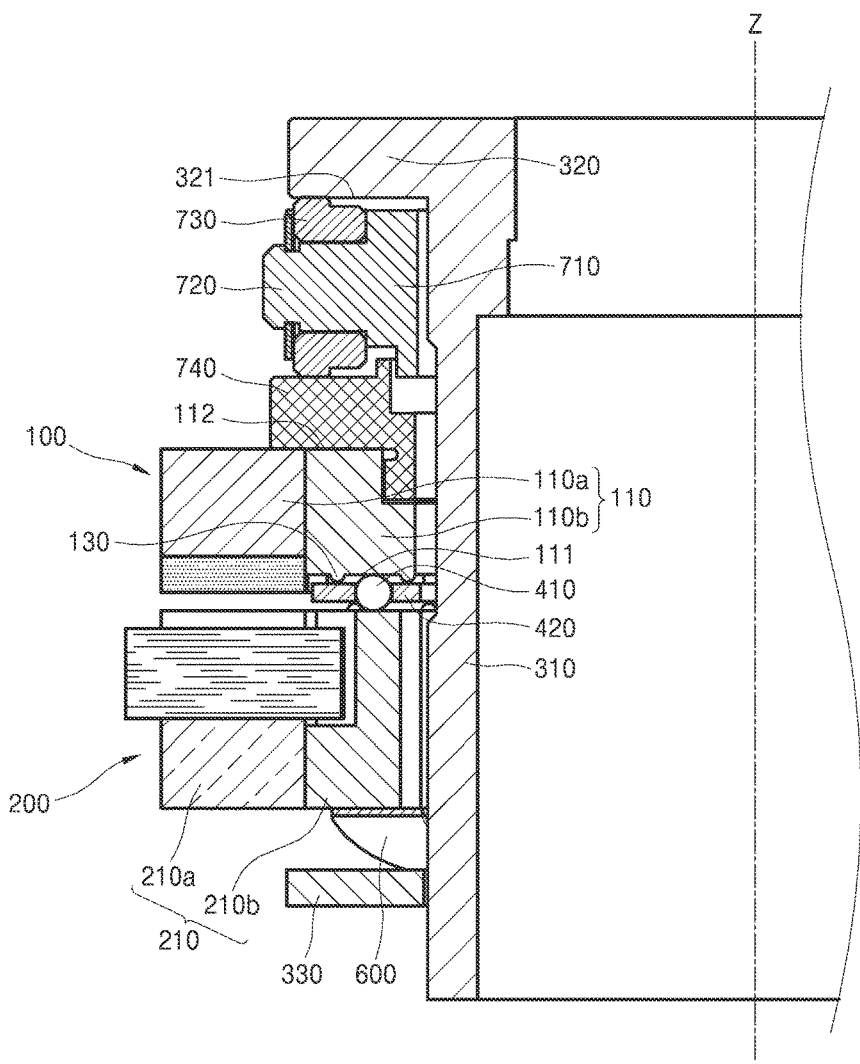
FIG. 7B is a cross-sectional view taken along a line B-B' of FIG. 7A according to an embodiment of the present disclosure.

FIG. 5 is an exploded perspective view illustrating a hollow brushless motor according to a second embodiment of the present disclosure, and FIG. 6 is a perspective view illustrating a speed reducer of a hollow brushless motor according to an embodiment of the present disclosure. FIG. 7A is a side view of a hollow brushless motor according to an embodiment of the present disclosure, and FIG. 7B is a cross-sectional view taken along a line B-B' of FIG. 7A according to an embodiment of the present disclosure. Since the brushless motor of FIGS. 5 to 7B are the same as or similar to the brushless motor 10 of FIGS. 1 to 4B except for a speed reducer 700, detailed duplicate descriptions thereof will be omitted.

Referring to FIGS. 5 to 7B, according to characteristics of the brushless motor, the stator 200 arranged to face the permanent magnets 150 of the rotor 100 may have the coils 230 winding around the corresponding tooth portions 220 of the stator 200. Accordingly, the coils 230 winding around the tooth portions 220 may protrude in the radial direction of the rotation axis Z direction. When an effective magnetic flux area formed between the permanent magnets 150 and the tooth portions 220 is increased to generate a greater power, a dimension of the entire brushless motor may be increased accordingly in the radial direction of the rotation axis Z direction. In order to increase a torque while maintaining the dimension of the entire brushless motor in the radial direction of the rotation axis direction, the speed reducer 700 may be included in the brushless motor to decrease a rotation speed and increase the torque.

Referring to FIGS. 5 and 6, the speed reducer 700 may include a speed reducer core 710 having a ring shape, a plurality of center shafts 720 arranged along an outside circumferential portion of the speed reducer core 710 at intervals in the circumferential the rotation axis Z direction the rotation axis Z direction and a plurality of rollers 730 rotatable connected to the corresponding center shafts 720. The speed reducer core 710 may include a ring shape having a diameter greater than a diameter D1 of the first fixing portion 310 to be inserted around the first fixing portion 310 of the center unit 300.

The plurality of center shafts 720 are extended along the radial direction of the rotation axis Z direction and arranged at the intervals along the outside circumferential portion of the speed reducer core 710. The plurality of center shafts 720 may be riving shafts to receive a power occurring in the hollow brushless motor from the rollers 730 and to transmit the power to outside.

The plurality of rollers 730 may be rotatably connected to the corresponding center shafts 720. An outside of the respective rollers 730 may contact the second fixing portion 320 and the rotor 100 to slide, and an inside of the respective rollers 730 may include bearings (not illustrated) to rotate about the corresponding center shafts. Since the plurality of rollers 730 contacts the rotor 100 and the second fixing portion 320 to slide and rotate about the radial the rotation axis Z direction, the plurality of the center shafts 720, to which the rollers are rotatably coupled, and the speed reducer 700, which is fixedly coupled to the center shafts 720, also rotate in the rotation axis Z direction. A method of transmitting the power generating from the rotor 100 by using the speed reducer 700 will be described with reference to the following drawings.

Referring to FIGS. 7A and 7B, the speed reducer 700 may be arranged between the rotor 100 and the second fixing portion 320 of the center unit 300. The speed reducer core 710 may be inserted around the first fixing portion 310 of the center unit 300, spaced apart from the first fixing portion 310 by a certain distance, and rotatable about the rotation axis Z. The plurality of center shafts 720 are arranged at intervals on an outer circumferential portion of the speed reducer core 710, and the plurality of rollers 730 are arranged to rotate about the corresponding center shafts 720.

A support member 740 having a ring shape may be arranged between the rotor core 110 and the plurality of rollers 730. The support member 740 of the ring shape may be inserted around the first fixing portion 310. The support member 740 may be spaced apart from the first fixing portion 310 by a certain distance and may be fixed to the rotor 100 to rotate together with the rotor 100. Although an embodiment of the present disclosure illustrates the support member 740 to be arranged between the plurality of rollers 730 and the rotor core 110, the present disclosure is not limited thereto. It is possible that the plurality of rollers 730 may directly contact the second surface 112 of the rotor 100.

The plurality of rollers 730 may contact the first surface 321 of the second fixing portion 320 and the support member 740. Here, the plurality of rollers 7309 may slide over the first surface 321 and the support member 740. For example, when the rotor 100 rotates, the support member 740 may rotate together with the rotor 100 about the rotation axis Z, and the plurality of rollers 730 may contact the support member 740 to rotate together with the support member 740 about the rotation axis Z. Here, since the second fixing portion 320 is fixed to the first fixing portion 310 and the plurality of rollers 730 contact the second fixing portion 320, a rotation speed of the plurality of rollers 730 may be reduced, but a torque of the plurality of rollers 730 may increase according to the reduction of the rotation speed.

The plurality of center shafts 720 to which the plurality of rollers 730 are rotatably connected may rotate together with the corresponding rollers 730 about the radial the rotation axis Z direction the rotation axis Z direction when the corresponding rollers 730 rotate, and the speed reducer core 710 to which the center shafts 720 may be fixedly connected may also rotate about the rotation axis Z direction. Here, the plurality of center shafts 720 may be a driving shaft to transmit a power generating from the rotor 100 to outside. Accordingly, by using the rotor 100 and stator 200 having the same effective magnet flux area, a high torque may be transmitted to outside. Although an embodiment of the present disclosure illustrates the speed reducer 700 using the plurality of rollers 730, the present disclosure is not limited thereto. It is possible to have a certain speed reducer to transmit a torque generating from the rotor 100.

Figure 8:
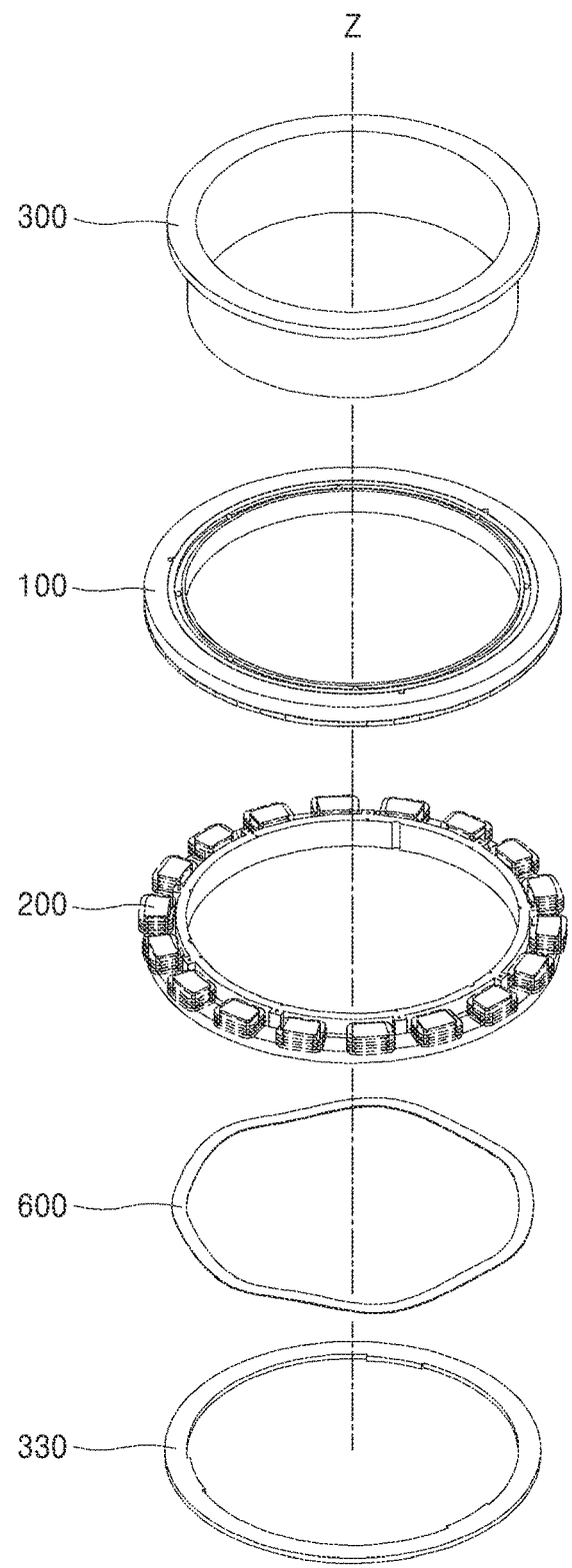
FIG. 8 is an exploded perspective view illustrating a hollow brushless motor according to a third embodiment of the present disclosure.
Figure 9:
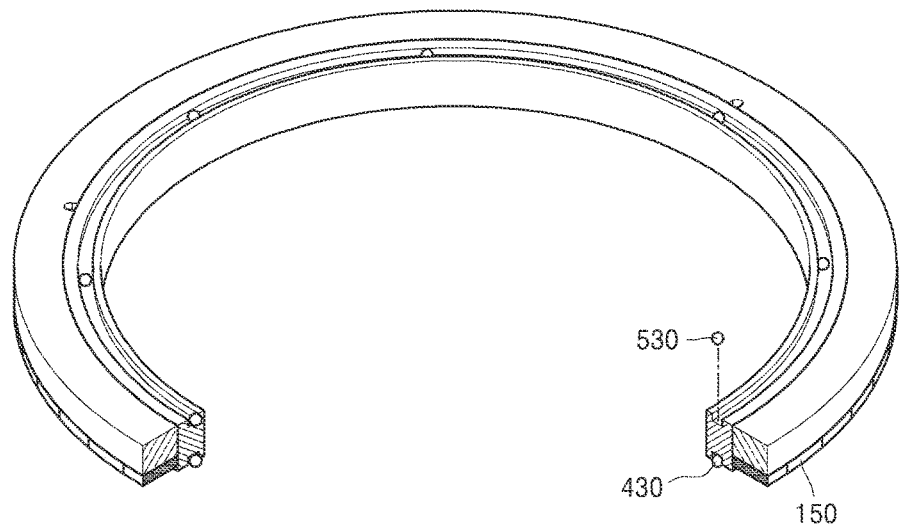
FIG. 9 is a partial cross-sectional view illustrating a stator of a hollow brushless motor according to an embodiment of the present disclosure.
Figure 10A:
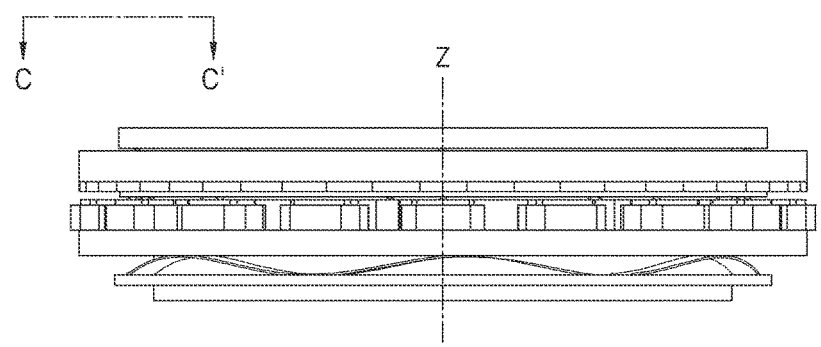
FIG. 10A is a side view of a hollow brushless motor according to an embodiment of the present disclosure.
Figure 10B:
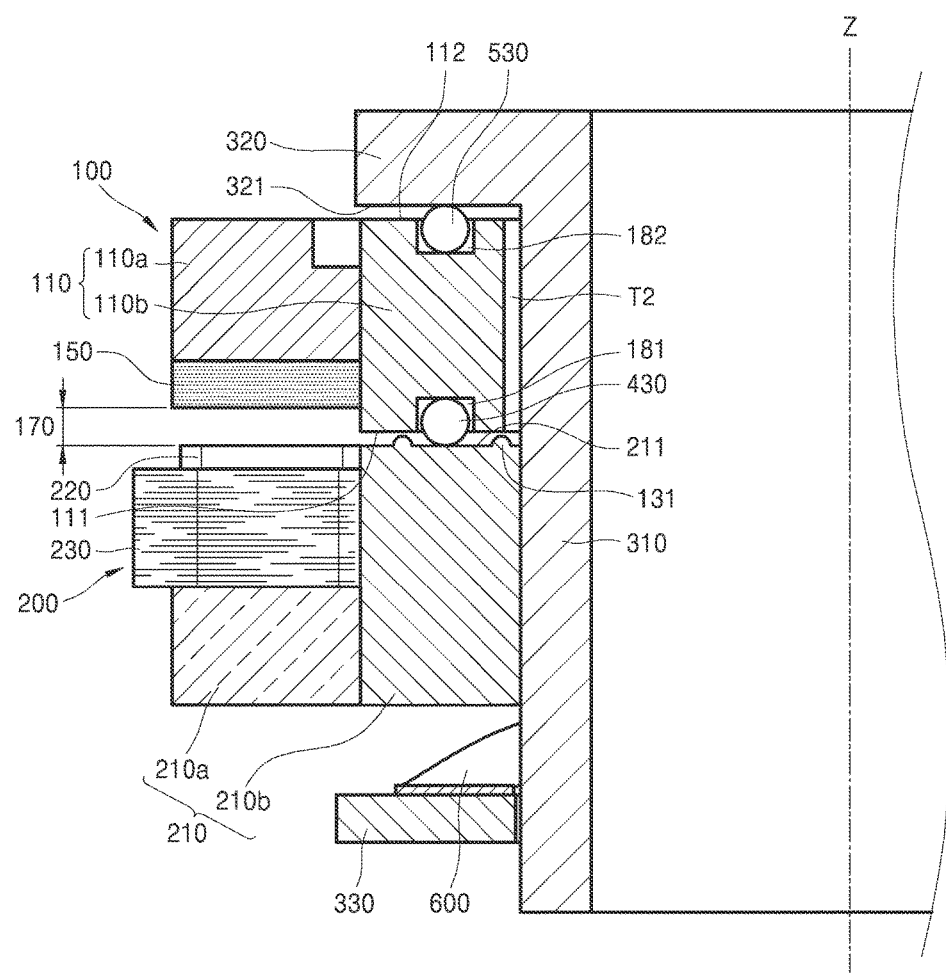
FIG. 10B is a cross-sectional view taken along a line C-C' of FIG. 10A according to an embodiment of the present disclosure.

FIG. 8 is an exploded perspective view illustrating a hollow brushless motor according to a third embodiment of the present disclosure, and FIG. 9 is a partial cross-sectional view illustrating a stator of a hollow brushless motor according to an embodiment of the present disclosure. FIG. 10A is a side view of a hollow brushless motor according to an embodiment of the present disclosure, and FIG. 10B is a cross-sectional view taken along a line C-C' of FIG. 10A according to an embodiment of the present disclosure. The brushless motor of FIGS. 8A to 10B are the same as or similar to the first embodiment of the brushless motor of FIGS. 1 to 4B except the first support 400 and the second support 500, detailed duplicate descriptions thereof will be omitted.

Referring to FIGS. 8 to 10B, as stated above, in the rotor 100 and the stator 200 of the hollow brushless motor 10, the permanent magnets 150 and the ends 221 of the tooth portions 220 of the stator core 210 are arranged to face each other in the rotation axis Z direction. Here, the first support 400 may support the rotor 100 and the stator 200 in the rotation axis Z direction to form the air gap 170 between the permanent magnets 150 and the ends 221 of the tooth portion 220.

Referring to FIGS. 8 to 10B, the first support 400 is arranged between the rotor 100 and the stator 200 and may have a plurality of third balls 430 to support the rotor 100 and the stator 200. The plurality of third balls 430 may be arranged in third ball receptacles 181 formed in the first surface 111 of the rotor 100. The third ball receptacles 181 may be a concave groove of a half sphere shape in which the third balls 430 are rotatably arranged. The plurality of third balls 430 accommodated in the corresponding third ball receptacles 181 to make a point-contact to support the rotor 100 and the stator 200. Here, the stator 200 may be fixedly coupled to the first fixing portion 310, and the rotor 100 accommodating the third balls 430 may be inserted around the first fixing portion 31 and spaced apart from the first fixing portion 310 by a certain distance in the radial the rotation axis Z direction the rotation axis Z direction such that the rotor 100 maintains the air gap 170 to rotate with respect to the stator 200 and the first fixing portion 310.

One or more second protrusions 131 may be extended from the first surface 211 of the stator 200 in the rotation axis Z direction and arranged with respect to a point-contact between the third balls 430 and the first surface 211 of the stator 200. The second protrusions 131 may limit a movement of the third balls 430 in the radial the rotation axis Z direction the rotation axis Z direction For example, the second protrusions 131 may be a ring-shape protrusion or a plurality of protrusions arranged in the radial the rotation axis Z direction the rotation axis Z direction.

The second support 500 is arranged between the rotor 100 and the second fixing portion 320 of the center unit 300 and may include a plurality of fourth balls 530 to support the rotor 100 and the second fixing portion 320. The plurality of fourth balls 530 may be arranged in fourth ball receptacles 182 formed in the second surface 112 of the rotor 100. The fourth ball receptacles 182 may be a concave groove of a half sphere shape in which the fourth balls 530 are rotatably arranged. The plurality of fourth balls 530 are accommodated in the corresponding fourth ball receptacles 182 to make a point-contact with the first surface 321 of the second fixing portion 320 to support the rotor 100. Here, the second fixing portion 320 may be fixed to the first fixing portion 310, and the rotor 100 accommodating the fourth balls 530 is inserted around the first fixing portion 310 and spaced apart from the first fixing portion 310 by the second gap T2 in the radial the rotation axis Z direction the rotation axis Z direction such that the rotor 100 rotates with respect to the first fixing portion 310 and the second fixing portion 320.

Figure 11:
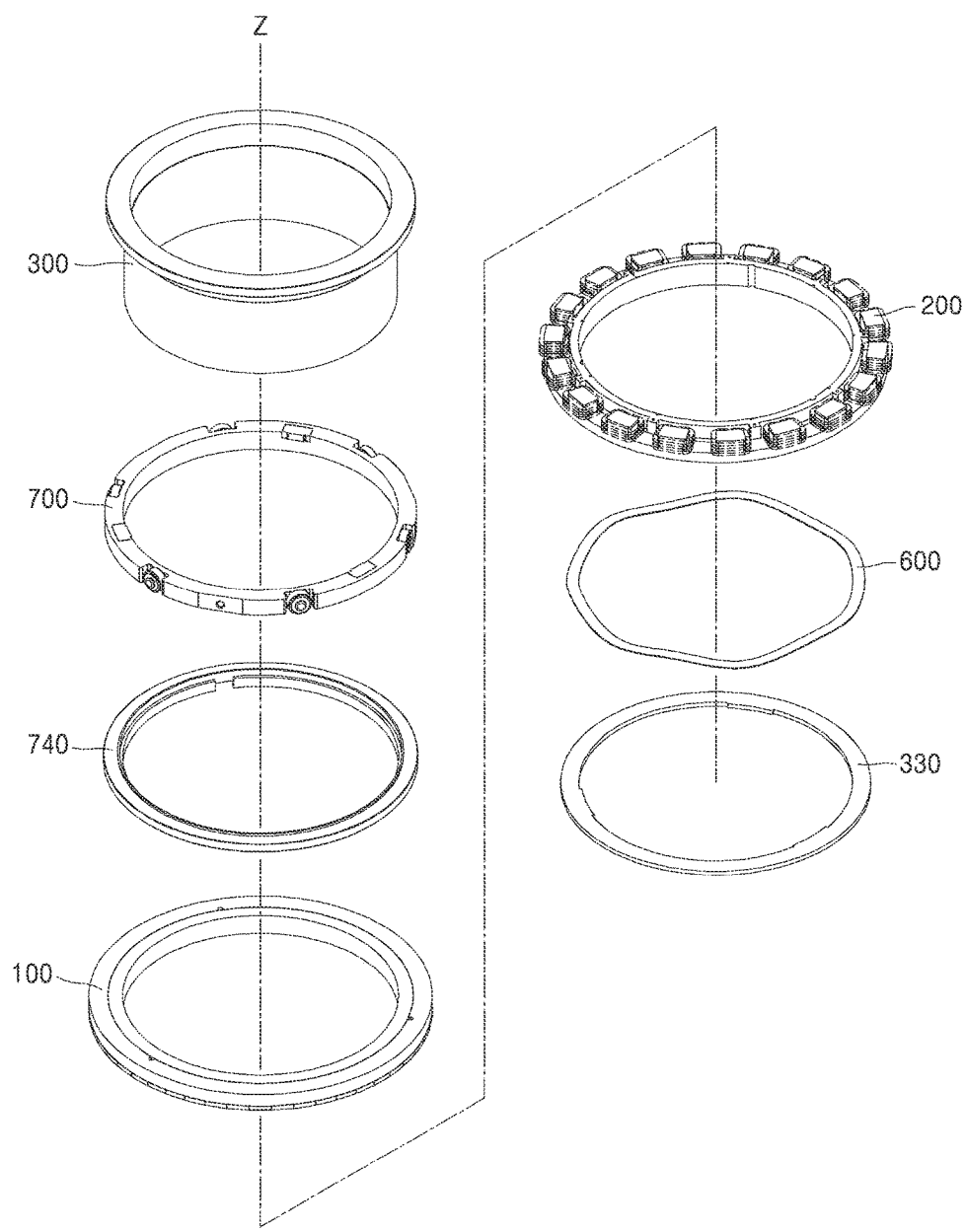
FIG. 11 is an exploded perspective view illustrating a hollow brushless motor according to a fourth embodiment of the present disclosure.
Figure 12A:
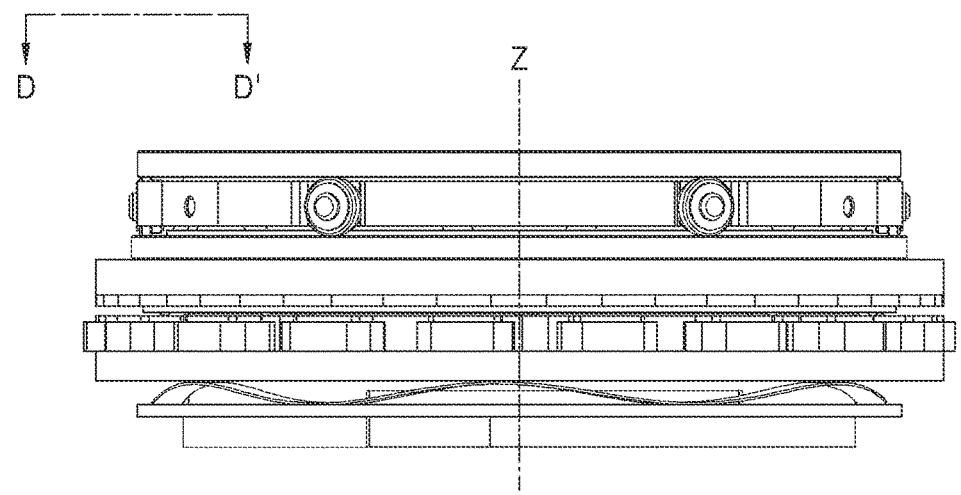
FIG. 12A is a side view of a hollow brushless motor according to an embodiment of the present disclosure.
Figure 12B:
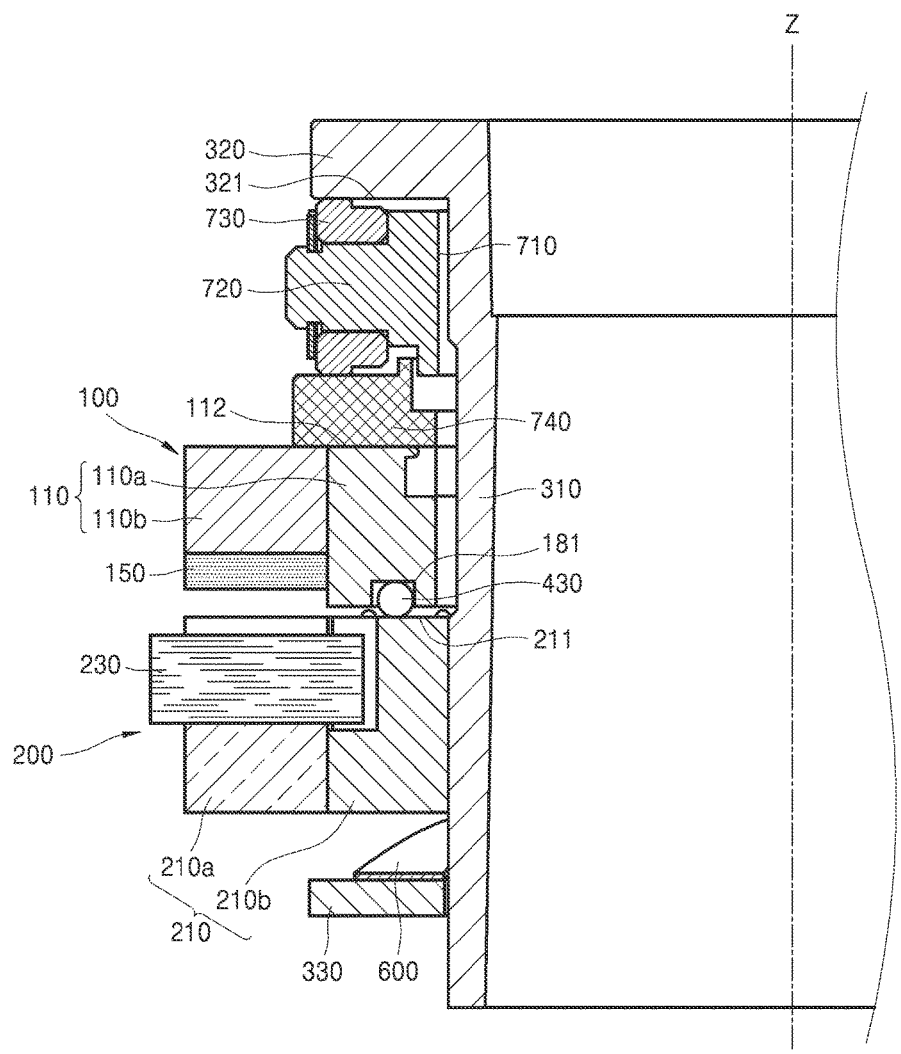
FIG. 12B is a cross-sectional view taken along a line D-D' of FIG. 12A according to an embodiment of the present disclosure.

FIG. 11 is an exploded perspective view illustrating a hollow brushless motor according to a fourth embodiment of the present disclosure. FIG. 12A is a side view of a hollow brushless motor according to an embodiment of the present disclosure, and FIG. 12B is a cross-sectional view taken along a line D-D' of FIG. 12A according to an embodiment of the present disclosure. The hollow brushless motor of FIGS. 11 to 12B is the same as or similar to the second and third embodiments of the hollow brushless motors of FIGS. 5 to 7B and FIGS. 8 to 10B except the speed reducer 700. And thus, detail duplicate descriptions will be omitted.

As described above, the speed reducer 700 reduces the rotation speed of the rotor 100 and increases the torque generating from the rotor 100. Referring to FIG. 11, the speed reducer 700 is arranged between the rotor 100 and the second fixing portion 320 to reduce the rotation speed and increase the torque generating from the rotor 100. The support member 740 is arranged between the rotor 100 and the speed reducer 700 to transmit the torque generating from the rotor 100 to the speed reducer 700.

Referring to FIGS. 12A and 12B, the support member 740 arranged to be fixed to the second surface 112 of the rotor 100 may rotate together with the rotor 100 with respect to the rotation axis Z direction such that the torque generating from the rotor 100 is transmitted to the support member 740. The rollers 730 of the speed reducer 700 contact and slide over the first surface 321 of the second fixing portion 320 and the support member 740 to increase the rotation speed and increase the torque. Here, the center shafts 720, to which the rollers 730 are rotatably connected, and the speed reducer core 710, to which the center shafts 720 are fixedly connected, may rotate together about the rotation axis Z direction. The center shafts 720 may transmit the torque generating from the rotor 100 to outside.

Figure 13:
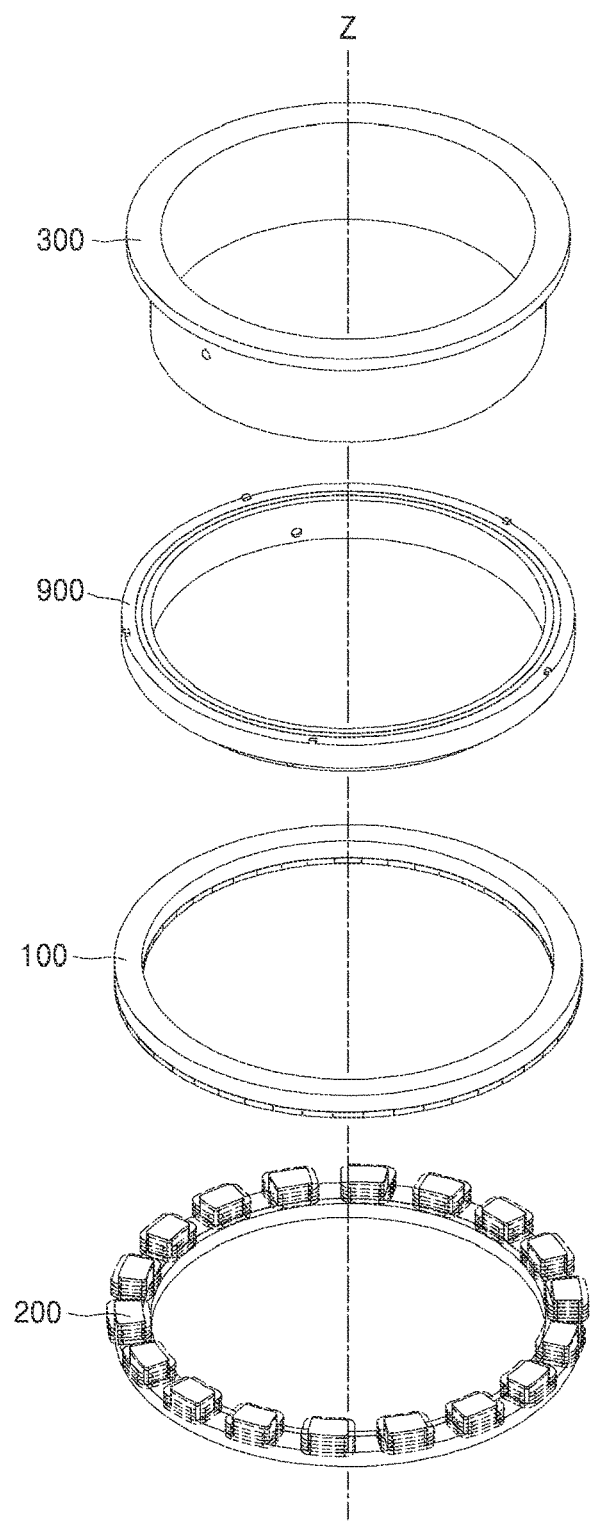
FIG. 13 is an exploded perspective view illustrating a hollow brushless motor according to a fifth embodiment of the present disclosure.
Figure 14:
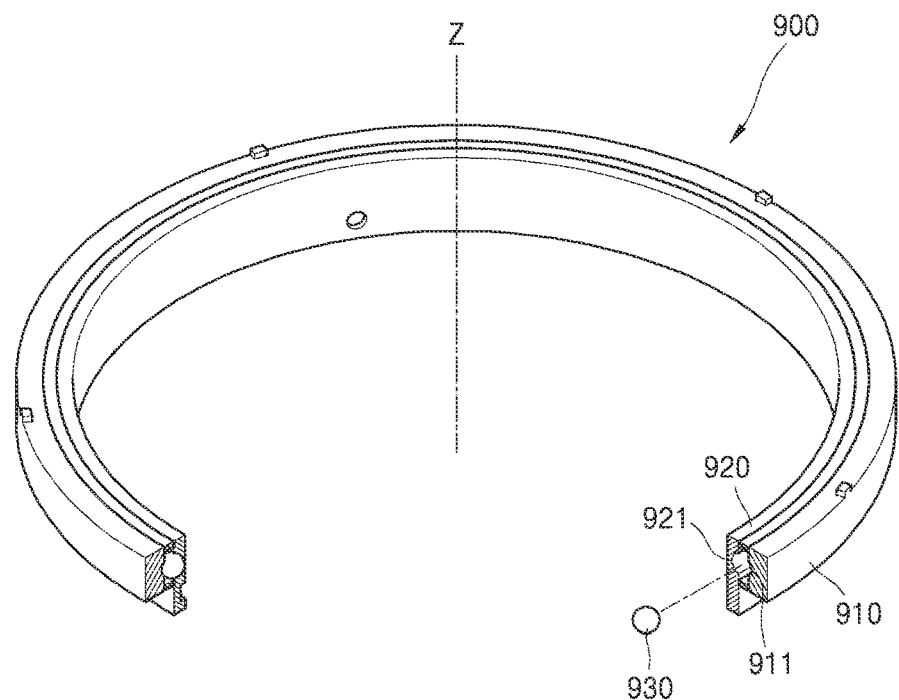
FIG. 14 is a partial cross-sectional view illustrating a radial ball bearing of a hollow brushless motor according to an embodiment of the present disclosure.
Figure 15A:
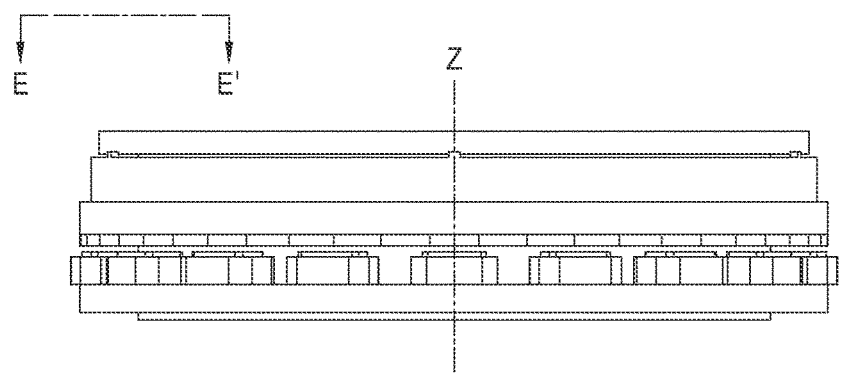
FIG. 15A is a side view of a hollow brushless motor according to an embodiment of the present disclosure.
Figure 15B:
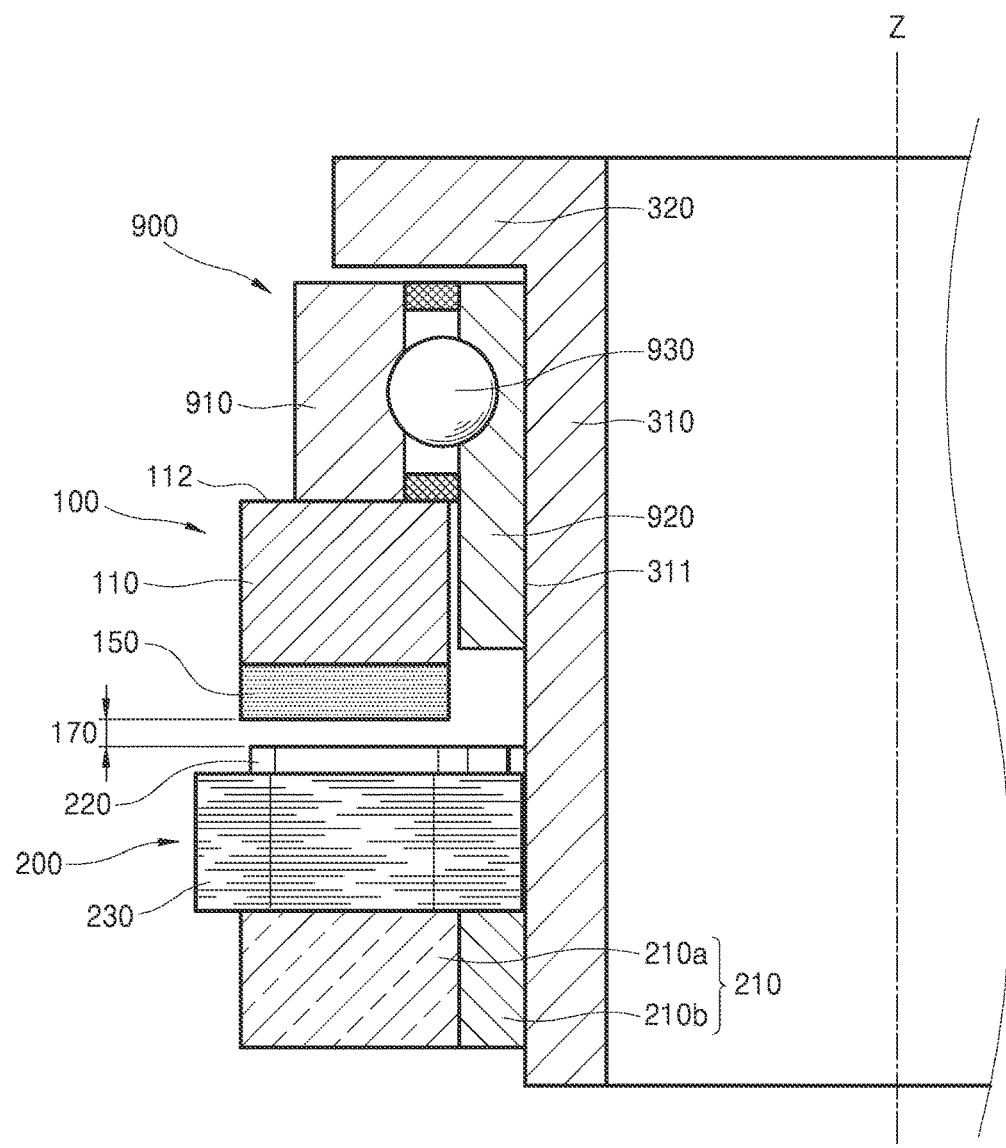
FIG. 15B is a cross-sectional view taken along a line E-E' of FIG. 15A according to an embodiment of the present disclosure.

FIG. 13 is an exploded perspective view illustrating a hollow brushless motor according to a fifth embodiment of the present disclosure, and FIG. 14 is a partial cross-sectional view illustrating a radial ball bearing of a hollow brushless motor according to an embodiment of the present disclosure. FIG. 15A is a side view of a hollow brushless motor according to an embodiment of the present disclosure, and FIG. 15B is a cross-sectional view taken along a line E-E' of FIG. 15A according to an embodiment of the present disclosure. Since the hollow brushless motor of FIGS. 13 to 15B are the same as or similar to the embodiment of the hollow brushless motor of FIGS. 1 to 4B except the radial ball bearing, detailed duplicate descriptions will be omitted.

Referring to FIGS. 13 to 15B, in the hollow brushless motor 10, the rotor 100 and the stator 200 may be arranged to face each other in the rotation axis Z direction. Here, the rotor and the stator 200 are supported to have the air gap 170 between the permanent magnets 150 of the stator 200 and the ends 221 of the tooth portions 220. Referring to FIGS. 13 and 14, a radial ball bearing 900 is arranged between the rotor 100 and the center unit 300 to support the rotor 100 such that the rotor 100 and the stator 200 fixed to the center unit 300 to face each other in the rotation axis Z direction.

The radial ball bearing 900 may be a ring shape and include a first housing 910, a second housing 920, and a plurality of center balls 930 arranged between the first housing 910 and the second housing 920 to be accommodated in the first housing 910 and the second housing 920. The first housing 910 and the second housing 920 may include a first center ball receptacle 911 and a second center ball receptacle 921 of a half sphere shape to accommodate the plurality of center balls 930. The first and second center ball receptacles 911 and 921 may be combined to accommodate one center ball 930. The first and second housings 910 and 920 may be fixedly coupled to the rotor 100 and the center unit 300, to which the stator 200 is fixed, respectively, to relatively rotate with respect to the rotation axis Z direction.

Referring to FIGS. 15A and 15B, the radial ball bearing 900 may be inserted into the first fixing portion 310 and arranged between the rotor 100 and the second fixing portion 320. The first housing 910 of the radial ball bearing 900 is fixed to the second surface 112 of the rotor 100, and the second housing of the radial ball bearing 900 is fixed to an outside 311 of the first fixing portion 310. For example, the first housing 910 and the second housing 920 may include a diamagnetic substance. The first housing 910 may rotate about the rotation axis Z with respect to the second housing 920 fixed to the first fixing portion 310, and the rotor 100 fixed to the second housing 920 is arranged to have a certain distance with the second housing 920 and rotates about the rotation axis Z with respect to the first fixing portion 310. Since the stator 200 is fixed to the outer surface 311 of the first fixing portion 310, the rotor 100 supported by the first housing 910 may rotate about the rotation axis Z while maintaining the air gap 170 with the stator 200.

Figure 16:
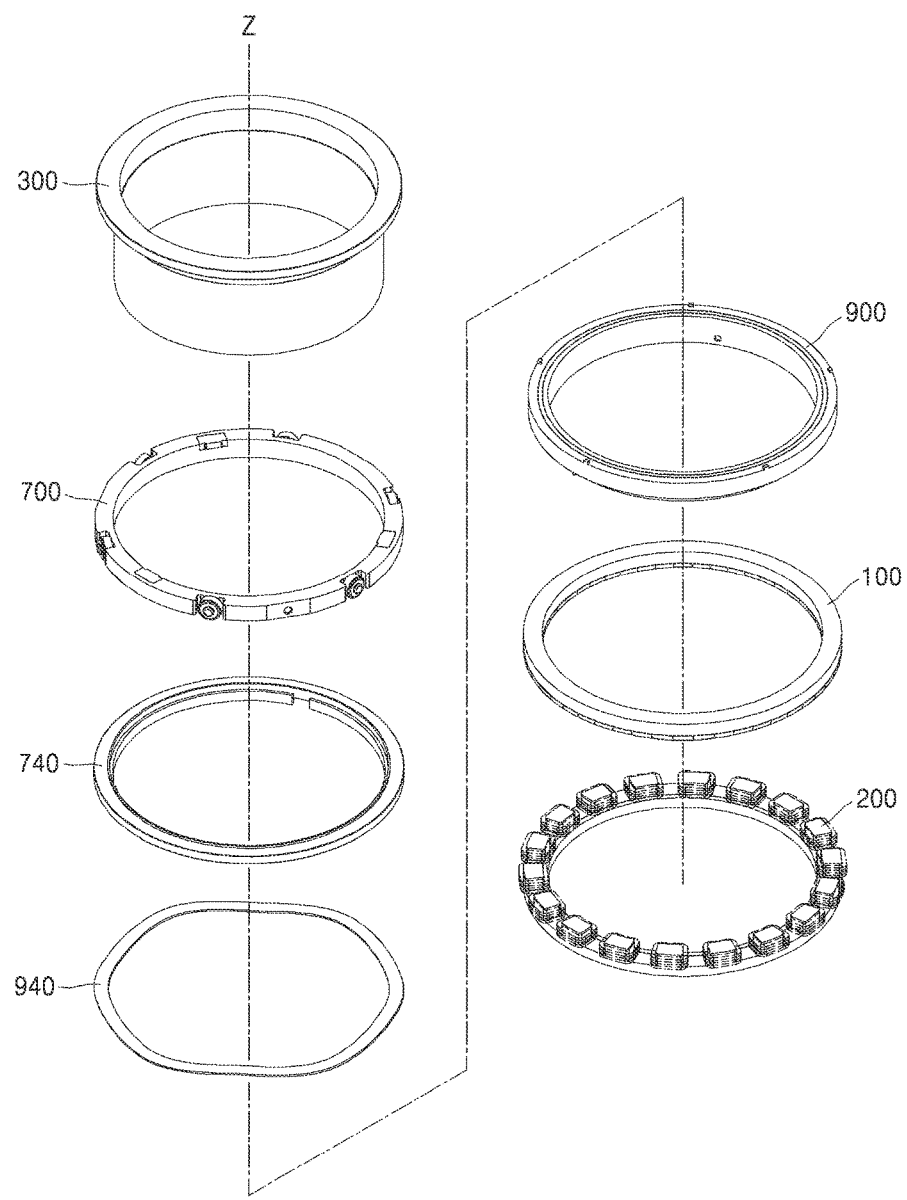
FIG. 16 is an exploded perspective view illustrating a hollow brushless motor according to a sixth embodiment of the present disclosure.
Figure 17A:
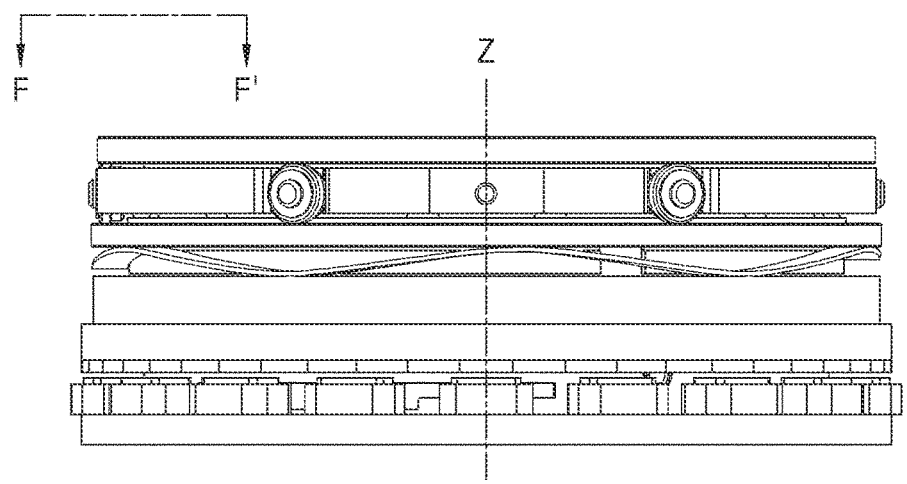
FIG. 17A is a side view of a hollow brushless motor according to an embodiment of the present disclosure.
Figure 17B:
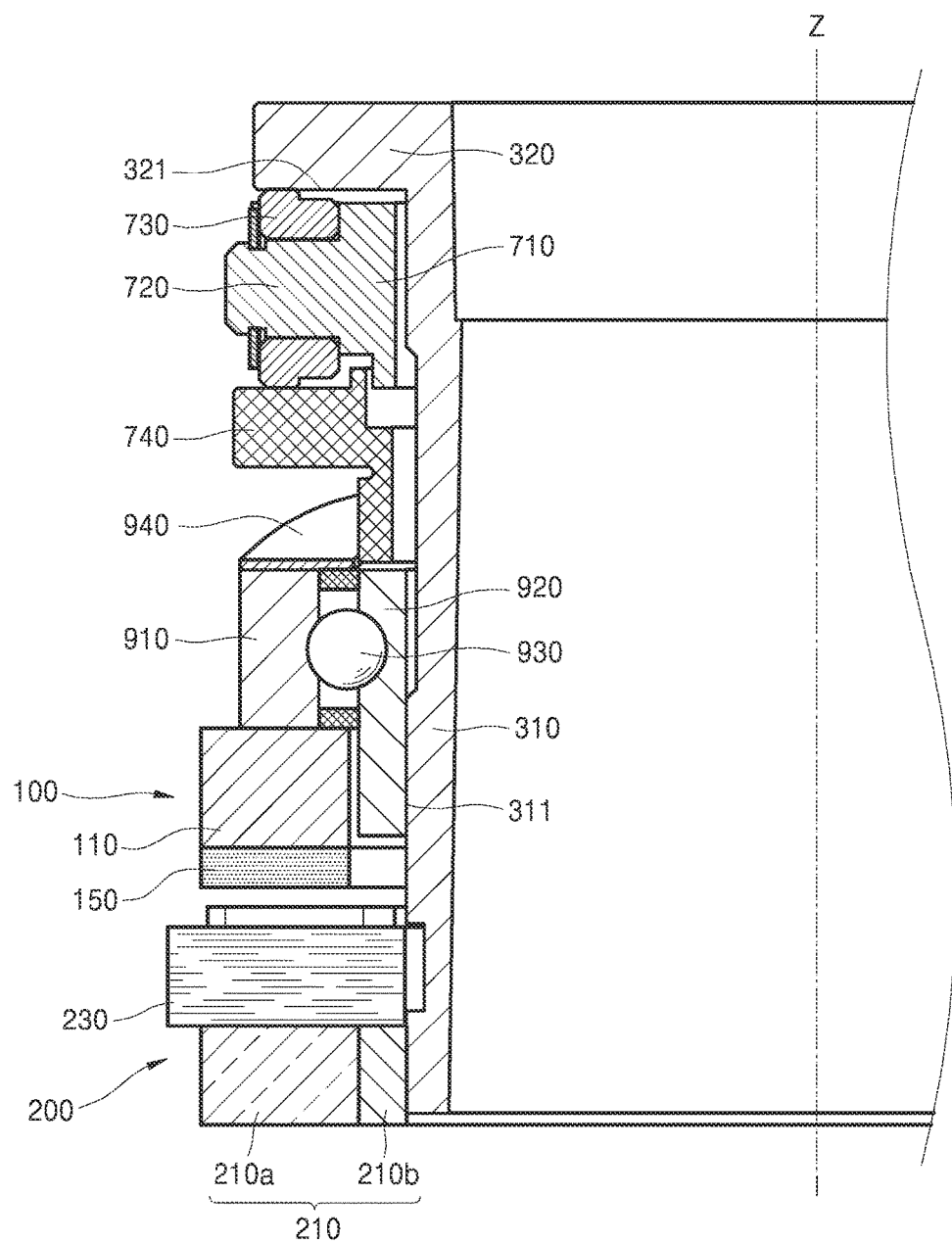
FIG. 17B is a cross-sectional view taken along a line F-F' of FIG. 17A according to an embodiment of the present disclosure.

FIG. 16 is an exploded perspective view illustrating a hollow brushless motor according to a sixth embodiment of the present disclosure. FIG. 17A is a side view of a hollow brushless motor according to an embodiment of the present disclosure, and FIG. 17B is a cross-sectional view taken along a line F-F' of FIG. 17A according to an embodiment of the present disclosure. Since the hollow brushless motor 10 of FIGS. 16 to 17B is the same as or similar to the second and fifth embodiments of the hollow brushless motor of FIGS. 5 to 7B and FIGS. 13 to 15B, respectively, except an arrangement structure of the speed reducer 700, detail descriptions will be omitted.

Referring to FIGS. 16 to 17B, as described above, the speed reducer 700 decreases the rotation speed and increases the torque. Referring to FIG. 16, the speed reducer 700 is arranged between the radial ball bearing 900 and the second fixing portion 320 to decrease the rotation speed of the rotor 100 and increase the torque generating from the rotor 100. The support member 740 is arranged between the radial ball bearing 900 and the speed reducer 700 to transmit the torque of the rotor 100 to the speed reducer 700.

Referring to FIGS. 17A and 17B, the support member 740 fixed to the first housing 910 of the radial ball bearing 900 rotates together with the rotor 100 about the rotation axis Z direction to transmit the torque of the rotor 100 to the support member 740. The rollers 730 of the speed reducer 700 contact and slide over the first surface 321 of the second fixing portion 320 and the support member 740 to decrease the rotation speed of the rotor 100 and increase the torque of the rotor 100. Here, the center shafts 720, to which the rollers 730 are rotatably connected, and the speed reducer core 710, to which the center shafts 720 are fixedly connected, rotate together about the rotation axis Z direction such that the center shafts 720 transmit the increased torque of the rotor 100 to outside.

A second elastic member 940 may be fixedly arranged between the first housing 910 and the support member 740 to apply an elastic force to the support member 740 in the rotation axis Z direction. Since the elastic force is applied by the second elastic member 940, the support member 740 may be spaced apart from the second housing 920 to apply a pressing force to the rollers 730 in the rotation axis Z direction. Accordingly, the torque generating from the rotor 100 is transmitted to the support member 740. When the support member 740 rotates, the torque is transmitted to the rollers 730 sliding over the support member 740, and the torque transmitted to the rollers 730 may be transmitted to outside through the center shafts 720.

According to various embodiments of the present disclosure, since a rotor and a stator of the brushless motor are arranged to face each other in a rotation axis direction, a driving system having a structure in which elements are arranged in the rotation axis direction may be realized and the entire driving system may be miniaturized.

In addition, the Vernier structure is applied to the hollow brushless motor, a high torque may be generated in a low speed rotation.

In addition, while the hollow brushless motor may be arranged in an area of a limited diameter from the rotation axis, the torque of the hollow brushless motor may be increased or at least maintained.

As used in the claim section of the present disclosure, the term "the" or a similar term to "the" may be intended to include the singular forms and/or the plural forms as well. In addition, the term "range" used in the present disclosure may include the respective values included in the range unless the context clearly indicates otherwise, and may be referred to the individual values within the range. Regarding operations or processes of the method of the present disclosure, the operations or processes may be performed in order unless the context clearly indicates otherwise. However, the present disclosure is not limited to the operations and processes to be performed in order. In the present disclosure, the usage of the illustrations is just for convenience of explanation, and the scope of the present disclosure is not limited to the illustrations terms unless the claims clearly indicate otherwise.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A hollow brushless motor comprising:
   a hollow shape rotor configured to be rotatable about a rotation axis;
   a hollow shape stator spaced apart from the rotor by a distance in a direction of the rotation axis and arranged to face the rotor; and
   a first support configured to maintain a gap between the rotor and the stator, and arranged between the rotor and the stator to support the rotor and the stator such that the rotor rotates with respect to the stator.

2. The hollow brushless motor of claim 1, wherein the first support comprises:
   a plurality of first balls configured to contact a first surface of the rotor and a first surface of the stator to support the rotor and the stator; and
   a hollow shape first retainer including first ball receptacles configured to accommodate the plurality of first balls.

3. The hollow brushless motor of claim 2, further comprising:
   a hollow shape center unit comprising:
      a first fixing portion having a cylindrical shape and being extended in the rotation axis direction,
      a second fixing portion having a hollow plate shape and being extended in a radial direction of the rotation axis from an outer side of the first fixing portion, and
      a third fixing portion having a hollow plate shape and being fixed to the outer side of the first fixing portion and arranged to face the second fixing portion,
   wherein the stator is inserted around the first fixing portion to be fixedly connected to the outer side of the first fixing portion, and
   wherein the rotor and the first retainer are inserted around the first fixing portion and spaced apart from the outer side of the first fixing portion in the radial direction of the rotation axis.

4. The hollow brushless motor of claim 3, further comprising:

a second support arranged between the rotor and the second fixing portion and configured to support the rotor and the second fixing portion such that the rotor rotates about the center unit.

5. The hollow brushless motor of claim 4, wherein the second support comprises:
   a plurality of second balls configured to contact a second surface of the rotor and a first surface of the second fixing portion configured to support the rotor and the second fixing portion; and
   a hollow shape second retainer including second ball receptacles configured to accommodate the plurality of second balls.

6. The hollow brushless motor of claim 3, further comprising:
   a speed reducer comprising:
      a main body having a ring shape and being arranged between the rotor and the second fixing portion, inserted around the first fixing portion, spaced apart from the outer side of the first fixing portion in the radial direction of the rotation axis,
      a plurality of center shafts arranged on an outer circumference of the main body and extended in the radial direction of the rotation axis, and
      a plurality of rollers configured to rotate about the corresponding center shafts,
   wherein the plurality of rollers contact and slide over the second surface of the rotor and the first surface of the second fixing portion which are arranged to face each other.

7. The hollow brushless motor of claim 6, further comprising:
   a ring shape support member arranged between the rotor and the speed reducer and fixed to the rotor to contact the plurality of rollers,
   wherein the plurality of rollers contact and slide over the second surface of the rotor and one side of the support member which are arranged to face each other.

8. The hollow brushless motor of claim 1,
   wherein the rotor comprises a plurality of permanent magnets with an N polarity and an S polarity alternately arranged in a circumferential direction of the rotation axis, and
   wherein the stator comprises:
      tooth portions arranged in the circumference direction of the rotation axis and arranged to face the plurality of permanent magnets in the rotation axis direction,
      a plurality of coils corresponding to the respective tooth portions, and
      a hollow shape stator core arranged to support the tooth portions.

9. The hollow brushless motor of claim 8, wherein a number of magnetic dipoles of the plurality of permanent magnets is represented by an Equation:

$$Z_2 = Z_1 \pm P,$$

where $Z_2$ is a number of magnetic dipoles of the rotor, $Z_1$ is a number of the tooth portions of the stator, and $P$ is a number of magnetic dipoles of the stator.

10. The hollow brushless motor of claim 1,
    wherein the rotor comprises a plurality of ball receptacles arranged on a first surface of the rotor, and
    wherein the first support comprises a plurality of first balls to be accommodated in the corresponding ball receptacles and to support the rotor and the stator by contacting a first surface of the rotor and a first surface of the stator arranged to face the first surface of the rotor.

11. The hollow brushless motor of claim 10, further comprising:
    a center unit comprising:
       a first fixing portion having a cylindrical shape and being extended in the rotation axis direction,
       a second fixing portion having a hollow plate shape and being extended in a radial direction of the rotation axis from an outer side of the first fixing portion, and
       a third fixing portion having a hollow plate shape and being fixed to the outer side of the first fixing portion and arranged to face the second fixing portion,
    wherein the stator is inserted around the first fixing portion to be fixedly connected to the outer side of the first fixing portion, and
    wherein the rotor is inserted around the first fixing portion and spaced apart from the outer side of the first fixing portion in the radial direction of the rotation axis.

12. The hollow brushless motor of claim 11, further comprising:
    a second support arranged between the rotor and the second fixing portion to support the rotor and the second fixing portion such that the rotor rotates about the center unit,
    wherein the rotor comprises a plurality of second ball receptacles arranged in a second surface of the rotor, and
    wherein the second support comprises a plurality of second balls to be accommodated in the corresponding second ball receptacles and arranged to support the rotor and the stator by contacting a second surface of the stator which is arranged to face the first surface of the rotor.

13. The hollow brushless motor of claim 12, further comprising:
    a speed reducer comprising:
       a main body having a ring shape and being arranged between the rotor and the second fixing portion, inserted around the first fixing portion, spaced apart from the outer side of the first fixing portion in the radial direction of the rotation axis,
       a plurality of center shafts arranged on an outer circumference of the main body and extended in the radial direction of the rotation axis, and
       a plurality of rollers configured to rotate about the corresponding center shafts,
    wherein the plurality of rollers contact and slide over the second surface of the rotor and the first surface of the second fixing portion which are arranged to face each other.

14. The hollow brushless motor of claim 13, further comprising:
    a ring shape support member arranged between the rotor and the speed reducer and fixed to the rotor to contact the plurality of rollers,
    wherein the plurality of rollers contact and slide over the second surface of the rotor and one side of the support member which are arranged to face each other.

* * * * *